United States Patent
Bade et al.

(10) Patent No.: US 7,475,247 B2
(45) Date of Patent: Jan. 6, 2009

(54) METHOD FOR USING A PORTABLE COMPUTING DEVICE AS A SMART KEY DEVICE

(75) Inventors: Steven A. Bade, Georgetown, TX (US); Ching-Yun Chao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 11/014,067

(22) Filed: Dec. 16, 2004

(65) Prior Publication Data

US 2006/0133615 A1 Jun. 22, 2006

(51) Int. Cl.
*H04L 9/00* (2006.01)

(52) U.S. Cl. .................. 713/169; 713/164; 713/167; 713/172; 713/189; 713/193; 726/9; 726/20; 380/277; 380/281; 380/282; 380/285

(58) Field of Classification Search ............... 713/164, 713/167, 169, 172, 189, 193; 726/9, 20; 380/277, 281, 282, 285
See application file for complete search history.

(56) References Cited

U.S. PATENT DOCUMENTS

| | | | |
|---|---|---|---|
| 4,218,582 A | 8/1980 | Hellman et al. | 178/22 |
| 4,817,140 A | 3/1989 | Chandra et al. | 380/4 |
| 5,502,765 A | 3/1996 | Ishiguro et al. | 380/24 |
| 5,568,552 A | 10/1996 | Davis | 380/4 |
| 5,604,801 A | 2/1997 | Dolan et al. | 380/21 |
| 5,787,172 A | 7/1998 | Arnold | 380/21 |
| 5,905,799 A | 5/1999 | Ganesan | 380/21 |
| 6,607,136 B1 | 8/2003 | Atsmon et al. | 235/492 |
| 6,607,707 B2 | 8/2003 | Reichman et al. | 423/648.1 |
| 6,615,350 B1 | 9/2003 | Schell et al. | 713/168 |
| 7,191,344 B2 * | 3/2007 | Lin et al. | 713/193 |
| 7,318,235 B2 * | 1/2008 | Grawrock | 726/26 |
| 2002/0095587 A1 * | 7/2002 | Doyle et al. | 713/186 |
| 2003/0024995 A1 | 2/2003 | Connor et al. | 235/492 |
| 2003/0108205 A1 | 6/2003 | Joyner et al. | 380/277 |
| 2003/0161473 A1 | 8/2003 | Fransdook | 380/277 |
| 2003/0174844 A1 * | 9/2003 | Candelore | 380/277 |
| 2005/0154875 A1 * | 7/2005 | Chao | 713/156 |
| 2005/0154898 A1 * | 7/2005 | Chao | 713/185 |
| 2006/0136748 A1 * | 6/2006 | Bade et al. | 713/193 |

\* cited by examiner

*Primary Examiner*—Kimyen Vu
*Assistant Examiner*—Beemnet W Dada
(74) *Attorney, Agent, or Firm*—Matt Talpis; Gregory K. Goshorn; Greg Goshorn, P.C.

(57) ABSTRACT

A first data processing system, which includes a first cryptographic device, is communicatively coupled with a second data processing system, which includes a second cryptographic device. The cryptographic devices then mutually authenticate themselves. The first cryptographic device stores a private key of a first asymmetric cryptographic key pair and a public key of a second asymmetric cryptographic key pair that is associated with the second data processing system. The second cryptographic device stores a private key of the second asymmetric cryptographic key pair and a public key of the first asymmetric cryptographic key pair that is associated with the first data processing system. In response to successfully performing the mutual authentication operation between the two cryptographic systems, the first data processing system is enabled to invoke sensitive cryptographic functions on the first cryptographic device while the first data processing system remains communicatively coupled with the second data processing system.

7 Claims, 17 Drawing Sheets

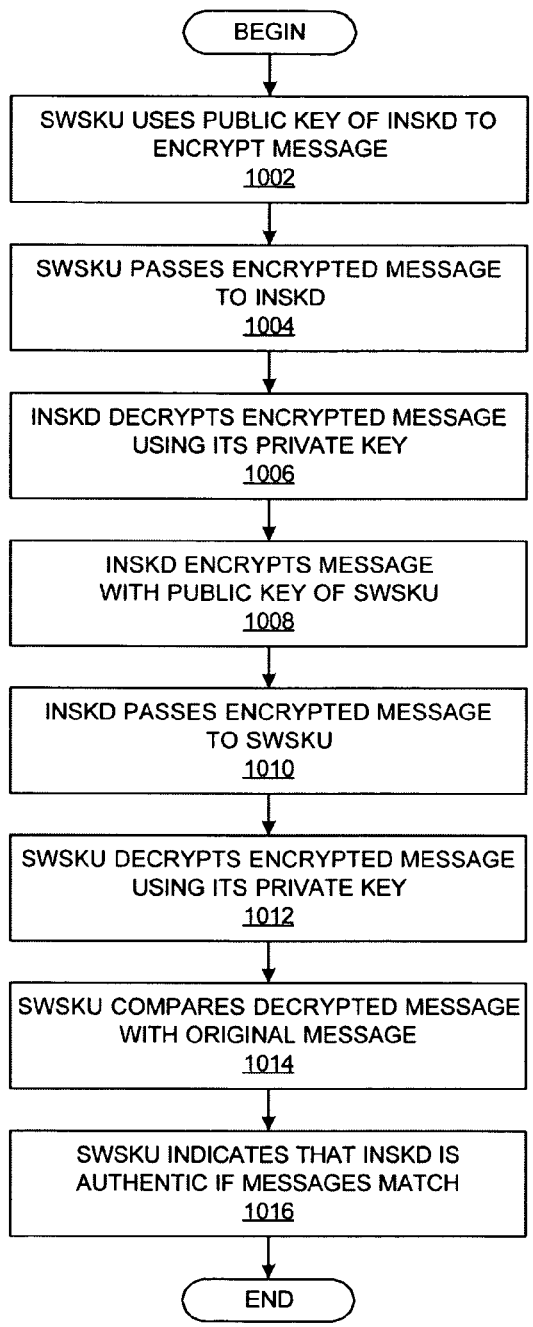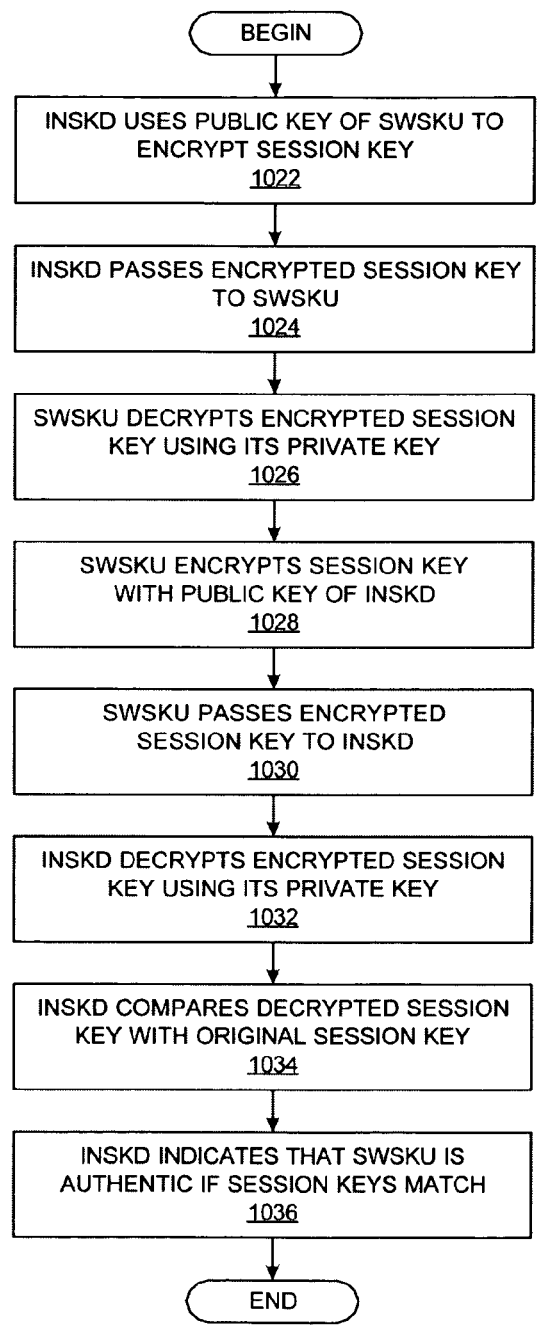
FIG. 10A
FIG. 10B

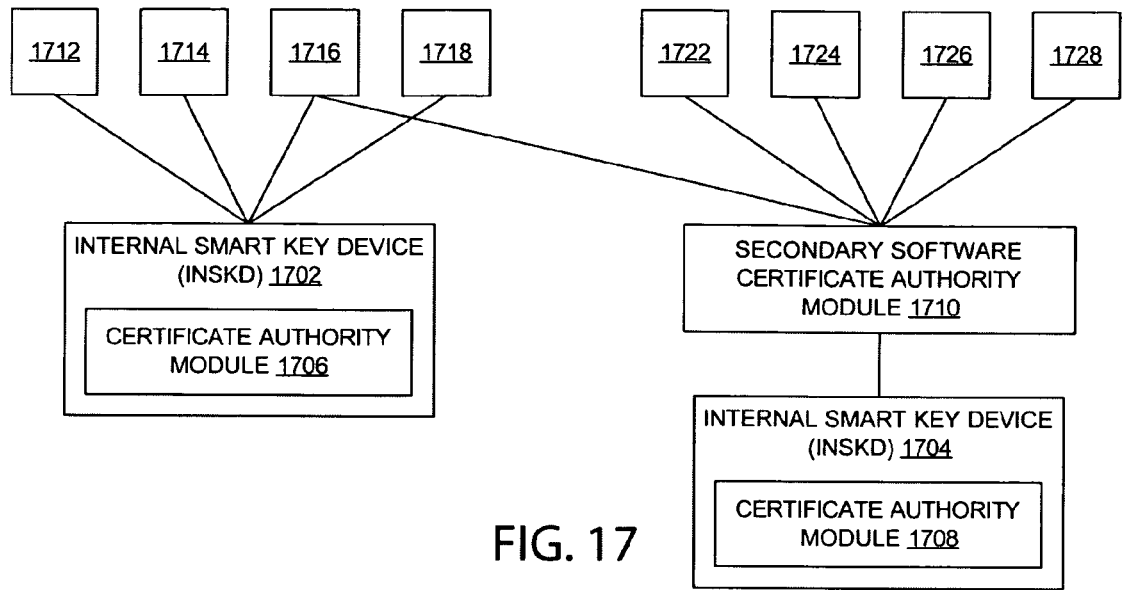
FIG. 17
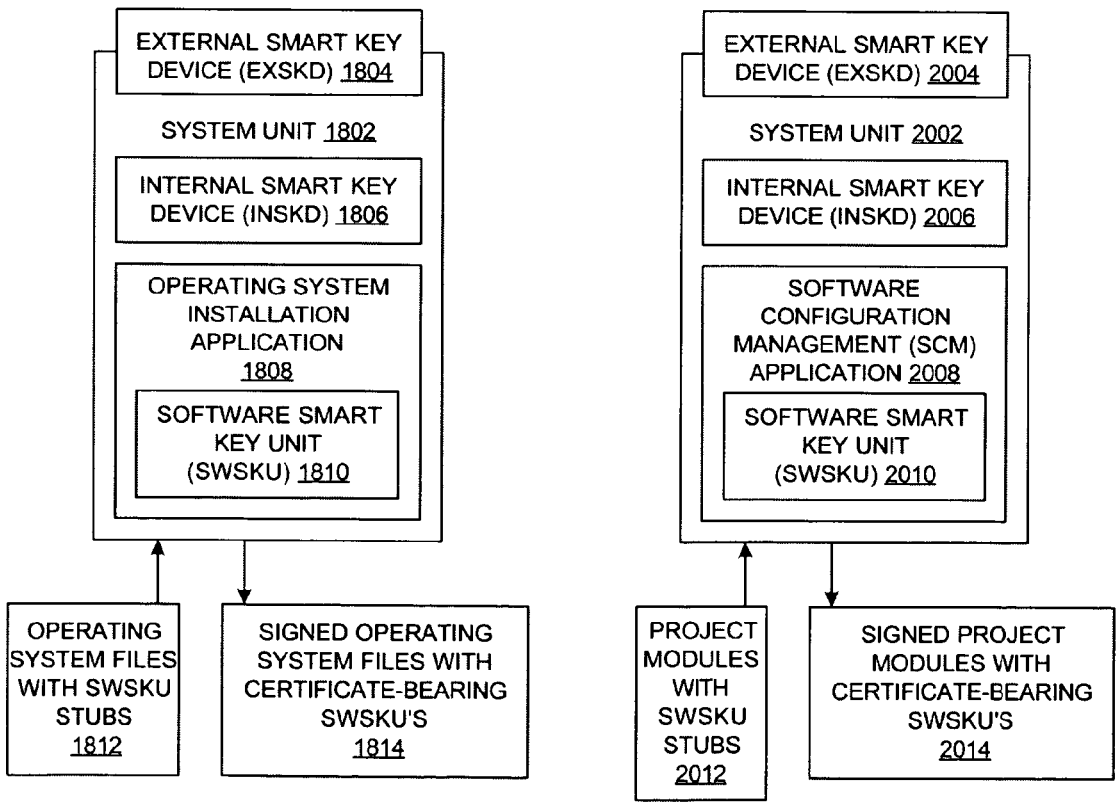
FIG. 18                    FIG. 20

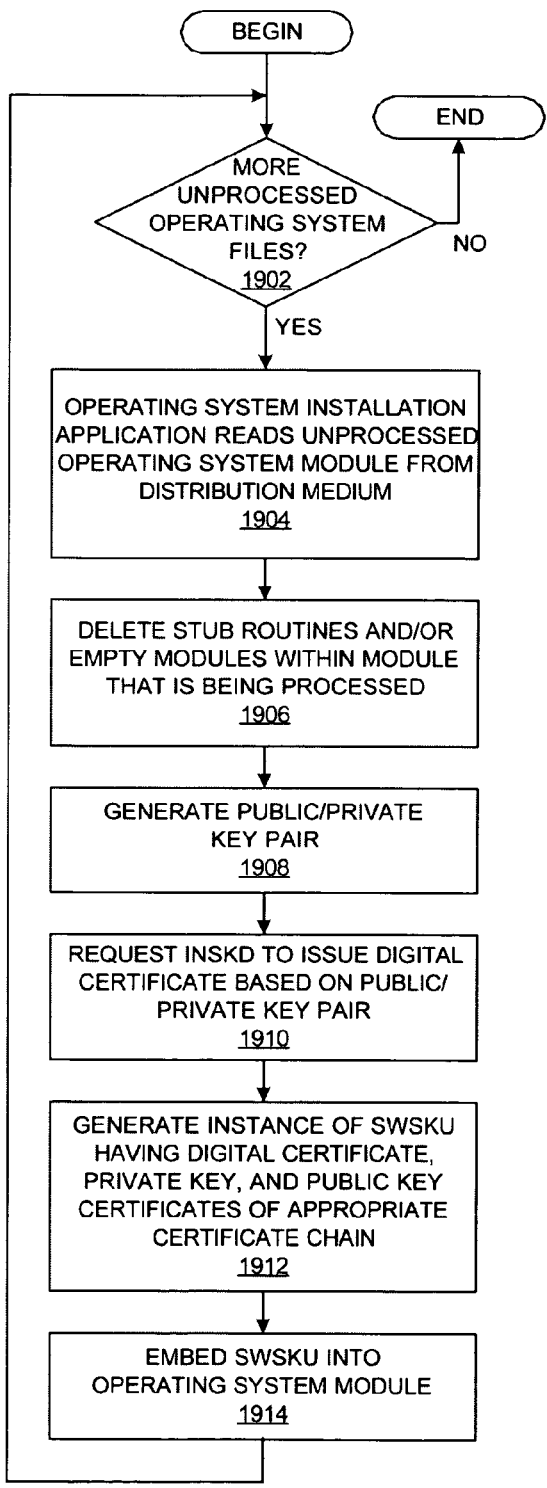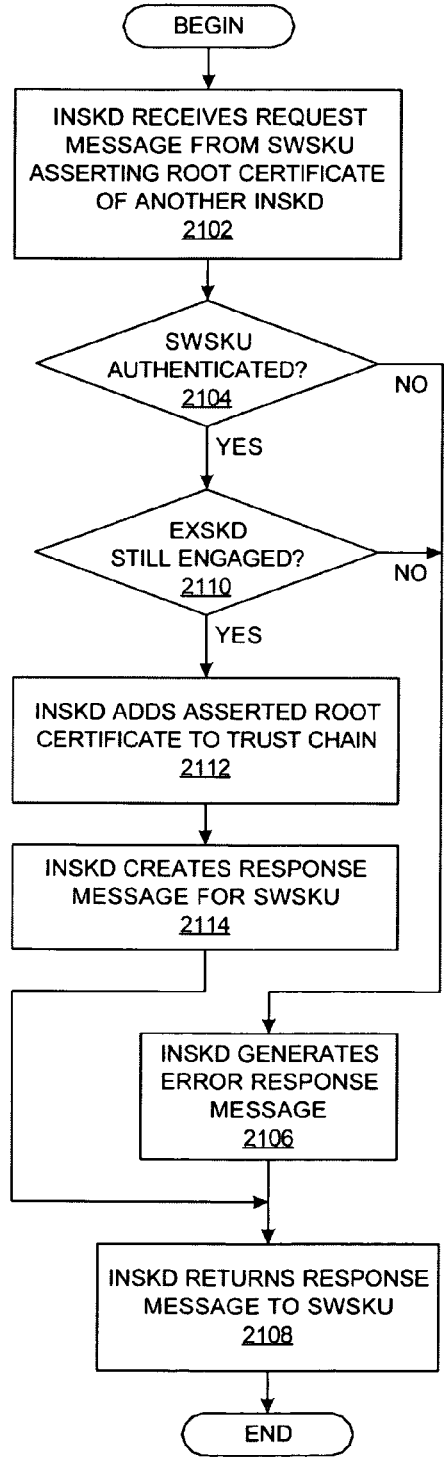
FIG. 19
FIG. 21

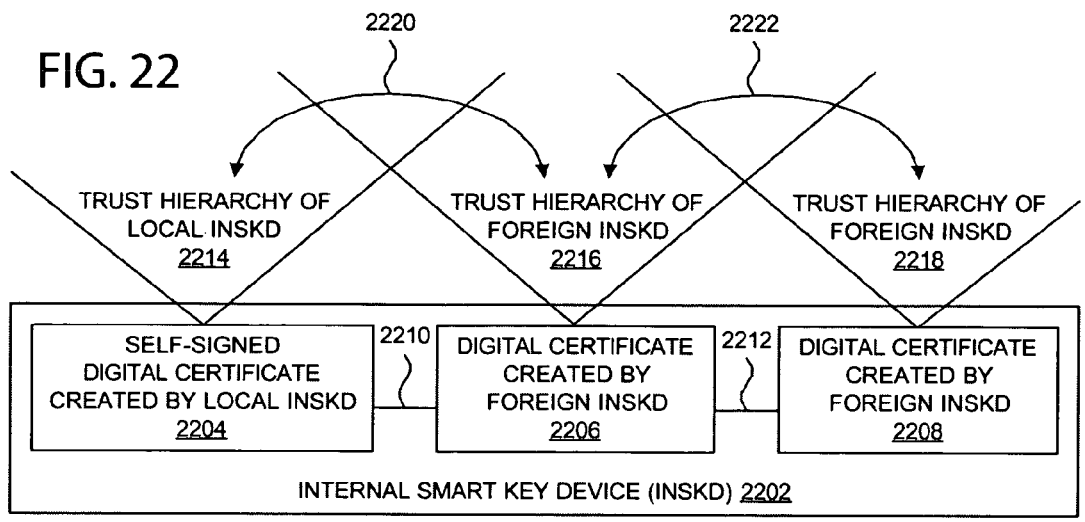
FIG. 22
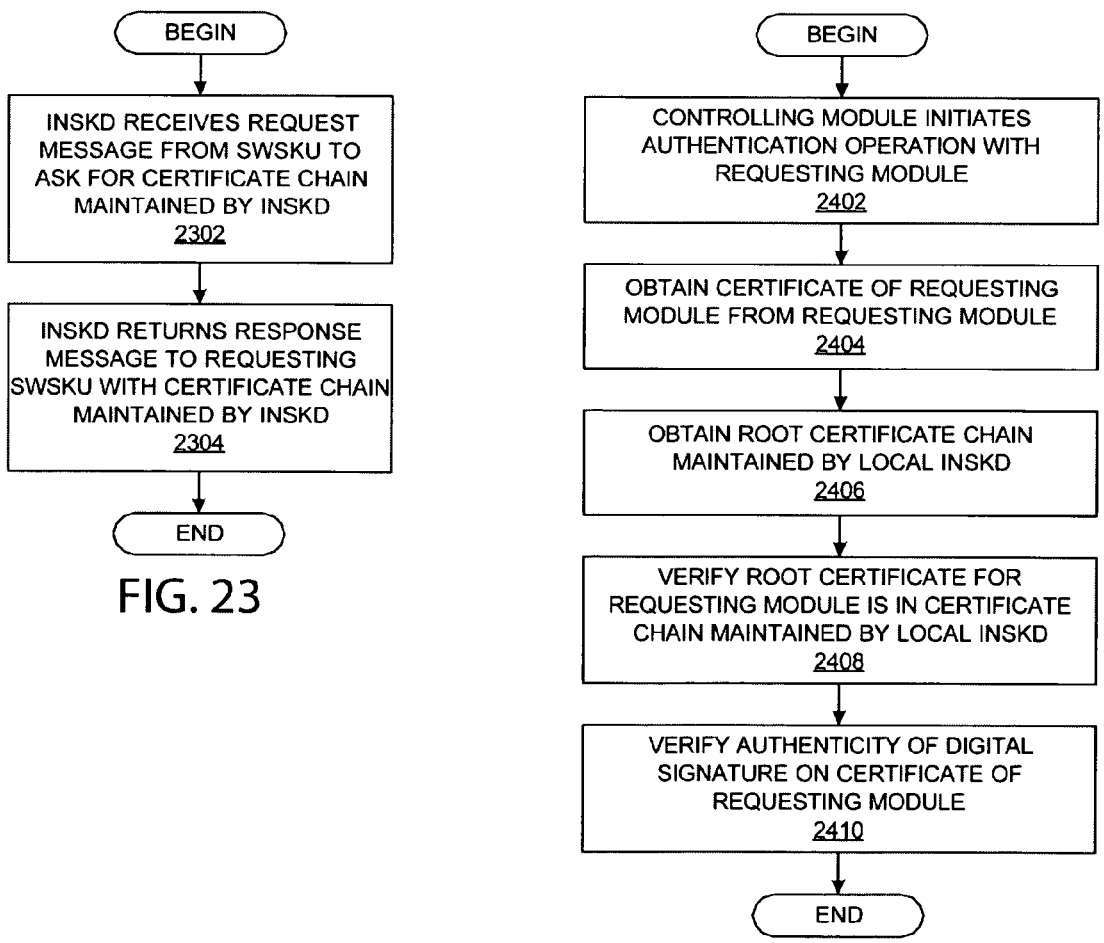
FIG. 23
FIG. 24

METHOD FOR USING A PORTABLE COMPUTING DEVICE AS A SMART KEY DEVICE

CROSS-REFERENCE TO RELATED APPLICATIONS

The present application is related to the following applications with a common assignee and are hereby incorporated by reference:

U.S. patent application Ser. No. 10/753,821, filed Jan. 8, 2004, titled "Method and system for establishing a trust framework based on smart key devices." and U.S. patent application Ser. No. 10/753,818, filed Jan. 8, 2004, titled "Method and System for Protecting Master Secrets Using Smart Key Devices."

BACKGROUND OF THE INVENTION

1. Field of the Invention

The present invention relates to an improved data processing system and, in particular, to a method and apparatus for data storage protection using cryptography.

2. Description of Related Art

Most data processing systems contain sensitive data that needs to be protected. For example, the data integrity of configuration information needs to be protected from illegitimate modification, while other information, such as a password file, needs to be protected from illegitimate disclosure. An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices. Even though multiple software and hardware mechanisms may be employed within a given data processing system to protect sensitive data, the sensitive data may also be encrypted so that if someone gains illegitimate access to the encrypted sensitive data, any copy of the encrypted sensitive data would be useless without the ability to decrypt the encrypted sensitive data.

The ability to ultimately protect all information that is contained within the data processing system has limitations, though. For example, in an effort to further protect a password file, the password file may be encrypted using yet another secret, such as a password or a cryptographic key, often referred to as a master secret. However, this new secret also needs to be protected in some manner. Thus, a system administrator may enter a type of dilemma in which any attempt to implement another layer of security results in additional sensitive information that also needs to be protected. Turning now to the present invention, the remaining figures depict exemplary embodiments of the present invention which resolves this dilemma.

Therefore, it would be advantageous to have a mechanism for securely storing and managing secret information, such as cryptographic keys. It would be particularly advantageous to securely store and manage master secrets that are used to protect other secret information.

SUMMARY OF THE INVENTION

A first data processing system, which includes a first, internal cryptographic device, is communicatively coupled with a second data processing system, which includes a second, internal cryptographic device. The two cryptographic devices authenticate themselves with respect to their respective systems. The two cryptographic device then mutually authenticate each other. The first cryptographic device stores a private key of a first asymmetric cryptographic key pair and a public key of a second asymmetric cryptographic key pair that is associated with the second data processing system. The second cryptographic device stores a private key of the second asymmetric cryptographic key pair and a public key of the first asymmetric cryptographic key pair that is associated with the first data processing system. In response to successfully performing the mutual authentication operation between the two cryptographic systems, the first data processing system is enabled to invoke sensitive cryptographic functions on the first cryptographic device while the first data processing system remains communicatively coupled with the second data processing system.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIGS. 10A-10B depict a pair of flowcharts that show further detail for the mutual authentication procedure that is shown in block 704 of FIG. 7;

FIG. 17 depicts a block diagram that shows an example of a trust model that is constructed of trust relationships that are based on the trust provided by internal smart key devices;

FIG. 18 depicts a block diagram that shows a data processing system for generating operating system files in which each programmatic entity in the operating system contains functionality for establishing trust relationships in a trust hierarchy based on internal smart key devices;

FIG. 19 depicts a flowchart that shows a process for generating operating system modules that contain software smart key units such that the operating system modules are able to perform authentication operations with each other;

FIG. 20 depicts a block diagram that shows a data processing system for generating project code in which each programmatic entity contains functionality for establishing trust relationships in a trust hierarchy based on internal smart key devices;

FIG. 21 depicts a flowchart that shows a process for extending the certificate chain for an internal smart key device;

FIG. 22 depicts a block diagram that shows an example of a trust model that is constructed of trust relationships that are based on the trust provided by a single local internal smart key device that maintains a certificate chain containing multiple root certificates for foreign internal smart key devices;

FIG. 23 depicts a flowchart that shows a process for obtaining a current root certificate chain maintained by the local internal smart key device;

FIG. 24 depicts a flowchart that shows a process for determining whether a digital certificate from a foreign internal smart key device is trustworthy;

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
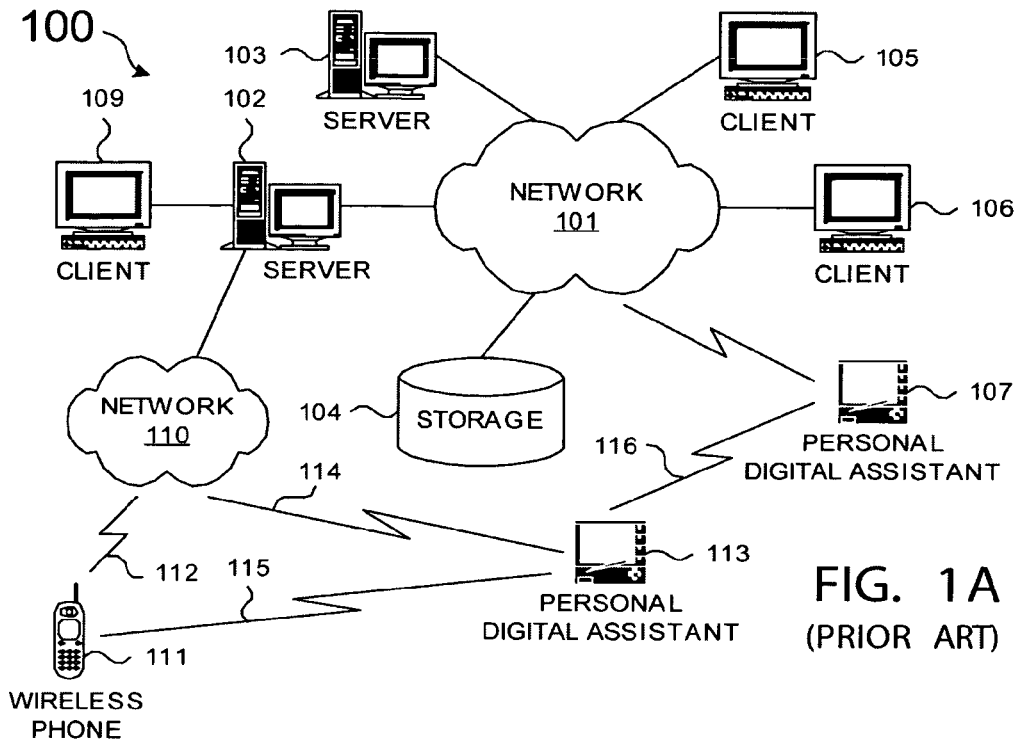
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
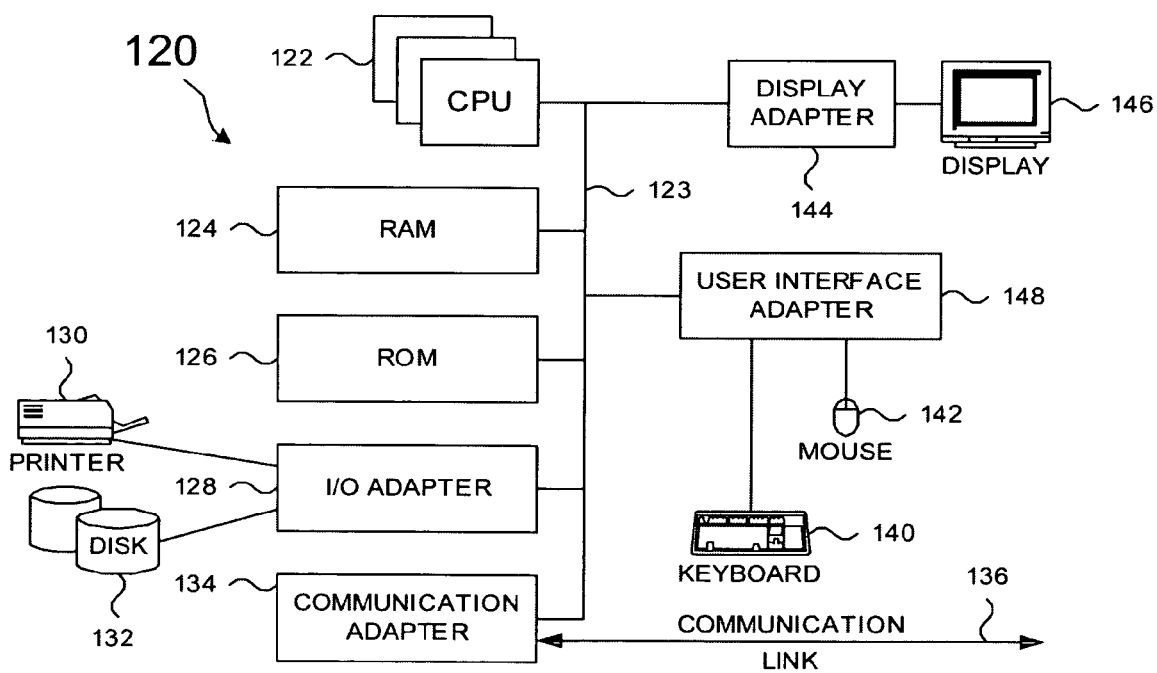
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to a mechanism for securing secret information through the use of a hardware security token. Before describing the present invention in more detail, though, some background information about digital certificates is provided for evaluating the operational efficiencies and other advantages of the present invention.

Digital certificates support public key cryptography in which each party involved in a communication or transaction has a pair of keys, called the public key and the private key. Each party's public key is published while the private key is kept secret. Public keys are numbers associated with a particular entity and are intended to be known to everyone who needs to have trusted interactions with that entity. Private keys are numbers that are supposed to be known only to a particular entity, i.e. kept secret. In a typical asymmetric cryptographic system, a private key corresponds to exactly one public key.

Within a public key cryptography system, since all communications involve only public keys and no private key is ever transmitted or shared, confidential messages can be generated using only public information and can be decrypted using only a private key that is in the sole possession of the intended recipient. Furthermore, public key cryptography can be used for authentication, i.e. digital signatures, as well as for privacy, i.e. encryption.

Encryption is the transformation of data into a form unreadable by anyone without a secret decryption key; encryption ensures privacy by keeping the content of the information hidden from anyone for whom it is not intended, even those who can see the encrypted data. Authentication is a process whereby the receiver of a digital message can be confident of the identity of the sender and/or the integrity of the message.

For example, when a sender encrypts a message, the public key of the receiver is used to transform the data within the original message into the contents of the encrypted message. A sender uses a public key of the intended recipient to encrypt data, and the receiver uses its private key to decrypt the encrypted message.

When authenticating data, data can be signed by computing a digital signature from the data using the private key of the signer. Once the data is digitally signed, it can be stored with the identity of the signer and the signature that proves that the data originated from the signer. A signer uses its private key to sign data, and a receiver uses the public key of the signer to verify the signature.

A certificate is a digital document that vouches for the identity and key ownership of entities, such as an individual, a computer system, a specific server running on that system, etc. Certificates are issued by certificate authorities. A certificate authority (CA) is an entity, usually a trusted third party to a transaction, that is trusted to sign or issue certificates for other people or entities. The certificate authority usually has some kind of legal responsibilities for its vouching of the binding between a public key and its owner that allow one to trust the entity that signed a certificate. There are many commercial certificate authorities; these authorities are responsible for verifying the identity and key ownership of an entity when issuing the certificate.

If a certificate authority issues a certificate for an entity, the entity must provide a public key and some information about the entity. A software tool, such as specially equipped Web browsers, may digitally sign this information and send it to the certificate authority. The certificate authority might be a commercial company that provides trusted third-party certificate authority services. The certificate authority will then generate the certificate and return it. The certificate may contain other information, such as a serial number and dates during which the certificate is valid. One part of the value provided by a certificate authority is to serve as a neutral and trusted introduction service, based in part on their verification requirements, which are openly published in their Certification Service Practices (CSP).

A certificate authority creates a new digital certificate by embedding the requesting entity's public key along with other identifying information and then signing the digital certificate with the certificate authority's private key. Anyone who receives the digital certificate during a transaction or communication can then use the public key of the certificate authority to verify the signed public key within the certificate. The intention is that the certificate authority's signature acts as a tamper-proof seal on the digital certificate, thereby assuring the integrity of the data in the certificate.

Other aspects of certificate processing are also standardized. Myers et al., "Internet X.509 Certificate Request Message Format", Internet Engineering Task Force (IETF) Request for Comments (RFC) 2511, March 1999, specifies a format that has been recommended for use whenever a relying party is requesting a certificate from a certificate authority. Adams et al., "Internet X.509 Public Key Infrastructure Certificate Management Protocols", IETF RFC 2511, March 1999, specifies protocols for transferring certificates. The present invention resides in a distributed data processing system that employs digital certificates; the description of FIGS. 2-3 provides background information about typical operations involving digital certificates.

Figure 2:
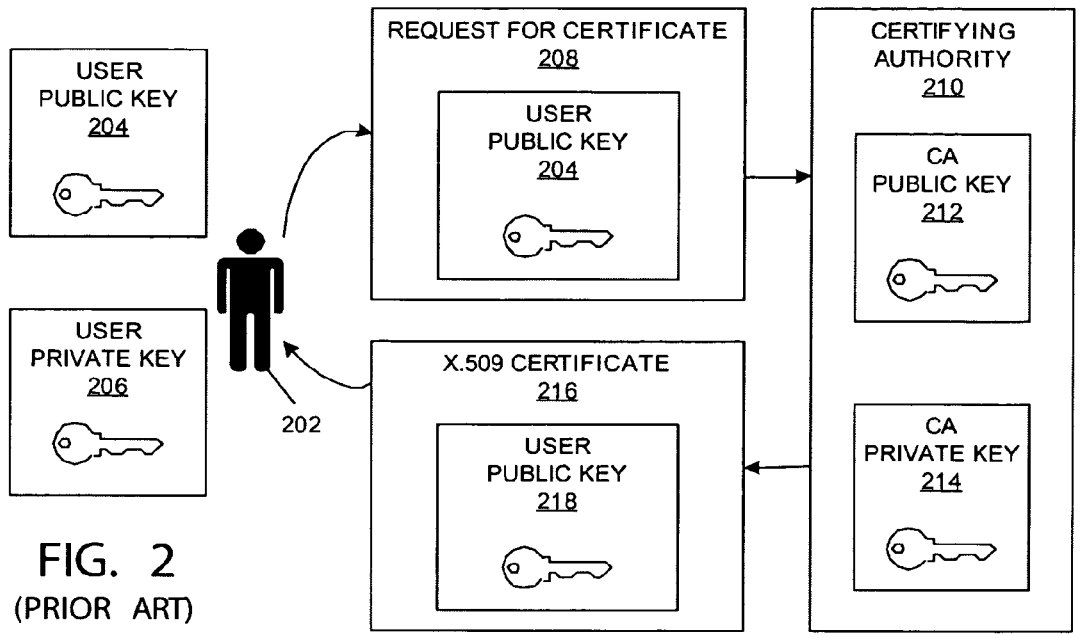
FIG. 2 depicts a block diagram that shows a typical manner in which an individual obtains a digital certificate.

With reference now to FIG. 2, a block diagram depicts a typical manner in which an individual obtains a digital certificate. User 202, operating on some type of client computer, has previously obtained or generated a public/private key pair, e.g., user public key 204 and user private key 206. User 202 generates a request for certificate 208 containing user public key 204 and sends the request to certificate authority 210, which is in possession of CA public key 212 and CA private key 214. Certificate authority 210 verifies the identity of user 202 in some manner and generates X.509 digital certificate 216 containing user public key 218. The entire certificate is signed with CA private key 214; the certificate includes the public key of the user, the name associated with the user, and other attributes. User 202 receives newly generated digital certificate 216, and user 202 may then present digital certificate 216 as necessary to engage in trusted transactions or trusted communications. An entity that receives digital certificate 216 from user 202 may verify the signature of the certificate authority by using CA public key 212, which is published and available to the verifying entity.

Figure 3:
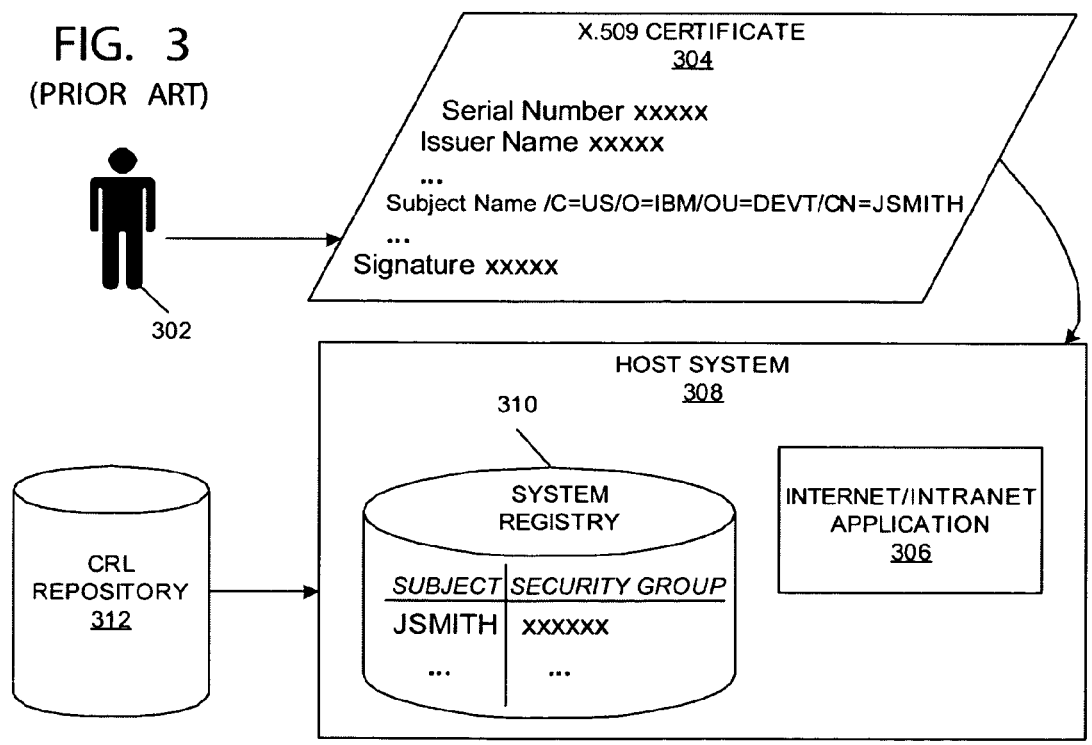
FIG. 3 depicts a block diagram that shows a typical manner in which an entity may use a digital certificate to be authenticated to a data processing system.

With reference now to FIG. 3, a block diagram depicts a typical manner in which an entity may use a digital certificate to be authenticated to a data processing system. User 302 possesses X.509 digital certificate 304, which is transmitted to an Internet or intranet application 306 on host system 308; application 306 comprises X.509 functionality for processing and using digital certificates. User 302 signs or encrypts data that it sends to application 306 with its private key.

The entity that receives certificate 304 may be an application, a system, a subsystem, etc. Certificate 304 contains a subject name or subject identifier that identifies user 302 to application 306, which may perform some type of service for user 302. The entity that uses certificate 304 verifies the authenticity of the certificate before using the certificate with respect to the signed or encrypted data from user 302.

Host system 308 may also contain system registry 310 which is used to authorize user 302 for accessing services and resources within system 308, i.e. to reconcile a user's identity with user privileges. For example, a system administrator may have configured a user's identity to belong to certain a security group, and the user is restricted to being able to access only those resources that are configured to be available to the security group as a whole. Various well-known methods for imposing an authorization scheme may be employed within the system.

In order to properly validate or verify a digital certificate, an application must check whether the certificate has been revoked. When the certificate authority issues the certificate, the certificate authority generates a unique serial number by which the certificate is to be identified, and this serial number is stored within the "Serial Number" field within an X.509 certificate. Typically, a revoked X.509 certificate is identified within a CRL via the certificate's serial number; a revoked certificate's serial number appears within a list of serial numbers within the CRL.

In order to determine whether certificate 304 is still valid, application 306 obtains a certificate revocation list (CRL) from CRL repository 312 and validates the CRL. Application 306 compares the serial number within certificate 304 with the list of serial numbers within the retrieved CRL, and if there are no matching serial numbers, then application 306 validates certificate 304. If the CRL has a matching serial number, then certificate 304 should be rejected, and application 306 can take appropriate measures to reject the user's request for access to any controlled resources.

Most data processing systems contain sensitive data that needs to be protected. For example, the data integrity of configuration information needs to be protected from illegitimate modification, while other information, such as a password file, needs to be protected from illegitimate disclosure. An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices. Even though multiple software and hardware mechanisms may be employed within a given data processing system to protect sensitive data, the sensitive data may also be encrypted so that if someone gains illegitimate access to the encrypted sensitive data, any copy of the encrypted sensitive data would be useless without the ability to decrypt the encrypted sensitive data.

The ability to ultimately protect all information that is contained within the data processing system has limitations, though. For example, in an effort to further protect a password file, the password file may be encrypted using yet another secret, such as a password or a cryptographic key, often referred to as a master secret. However, this new secret also needs to be protected in some manner. Thus, a system administrator may enter a type of dilemma in which any attempt to implement another layer of security results in additional sensitive information that also needs to be protected. Turning now to the present invention, the remaining figures depict exemplary embodiments of the present invention which resolves this dilemma.

Figure 4:
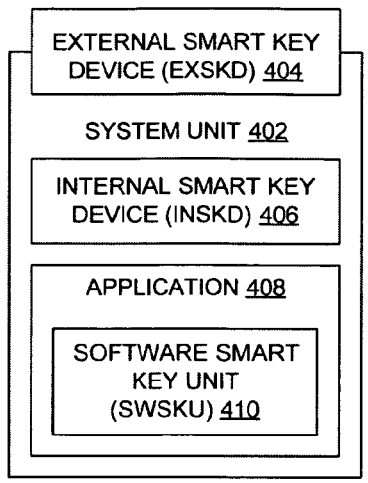
FIG. 4 depicts a block diagram that shows a portion of a data processing system that accepts a removable hardware device to enable cryptographic functionality in a hardware security unit within the data processing system.

With reference now to FIG. 4, a block diagram depicts a portion of a data processing system that accepts a removable hardware device to enable cryptographic functionality in a hardware security unit within the data processing system in accordance with an embodiment of the present invention. The present invention employs a pair of matching smart key devices that hold cryptographic keys and perform encryption functions. System unit 402 interfaces with external smart key device (EXSKD) 404, which is a portable or removable device. System unit 402 also contains internal smart key device (INSKD) 406, which is a matching device that is an integral part of the host system that receives the removable device, such as a motherboard. The internal smart key device is preferably a packaged, integrated circuit that is difficult to remove from the host system; while it may be described as a hardware security unit or device, it may also comprise a processing unit for executing instructions. In this example, EXSKD 404 and INSKD 406 are paired devices. The removable device is physically secured by system administration personnel, e.g., an IT administrator; the removable device, i.e. EXSKD 404, is inserted into a host machine, such as system unit 402, when an IT administrator needs to enable certain cryptographic functions that can be performed by the matching device on the host machine, i.e. INSKD 406. In other words, certain cryptographic functions are available when the external smart key device is inserted into the system unit. INSKD 406 produces results that are needed by the IT administrator because INSKD 406 contains one or more particular cryptographic private keys for producing certain cryptographic output. Application 408 on system unit 402 has software smart key unit (SWSKU) 410 that is analogous to EXSKD 404 and INSKD 406. Application 408 uses SWSKU 410 to perform certain functions, which are explained in more detail hereinbelow.

Figure 5:
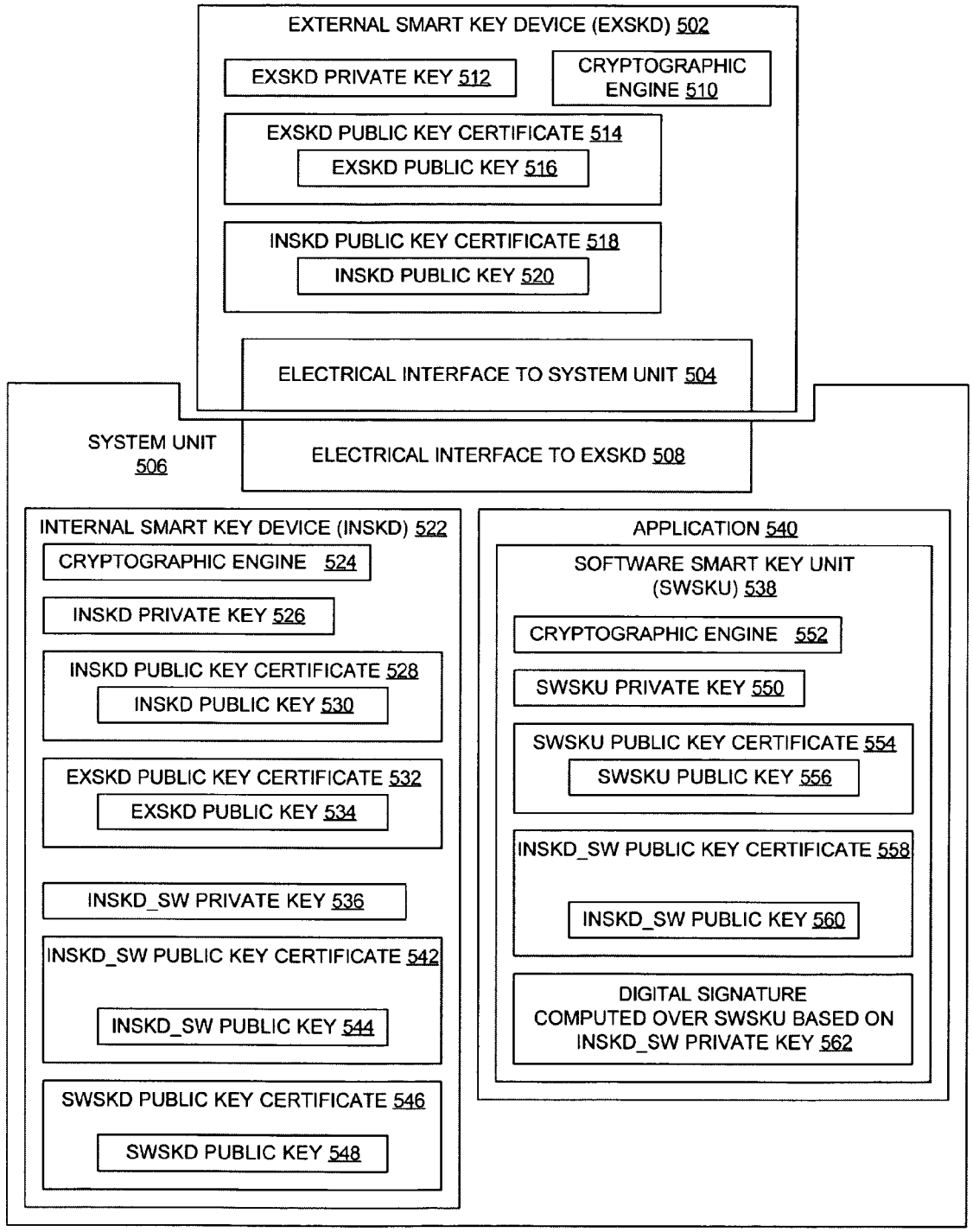
FIG. 5 depicts a block diagram that shows a system unit that contains an internal smart key device and that uses an external smart key device to enable the cryptographic functionality within the internal smart key device.

With reference now to FIG. 5, a block diagram depicts a system unit that contains an internal smart key device and that uses an external smart key device to enable the cryptographic functionality within the internal smart key device in accordance with an embodiment of the present invention. FIG. 5 is similar to FIG. 4 except that FIG. 5 includes additional detail on the cryptographic keys that are stored within the various components.

External smart key device (EXSKD) 502 is a removable hardware device; EXSKD 502 is preferably a portable device that is controlled by a system administrator and that acts as hardware security token. External smart key device 502 with electrical interface 504 is insertable into system unit 506 with electrical interface 508; external smart key device 502 and system unit 506 electrically engage through their respective interfaces to exchange electrical signals representing digital information.

External smart key device 502 contains cryptographic engine 510 for performing cryptographic functions using various data items that are stored in external smart key device 502. EXSKD private key 512 is stored in a manner such that it cannot be read or accessed by entities that are external to EXSKD 502; EXSDK 502 does not contain functionality for transmitting or otherwise providing a copy of EXSKD private key 512. EXSKD public key certificate 514 contains a copy of EXSKD public key 516 that corresponds to EXSKD private key 512 as an asymmetric cryptographic key pair. EXSKD 502 also contains a copy of INSKD public key certificate 518, which itself contains a copy of INSKD public key 520 that corresponds to INSKD private key 526 as an asymmetric cryptographic key pair. The copy of INSKD public key certificate 518 may be written onto EXSKD 502 as part of its manufacturing or initialization processes.

System unit 506 contains internal smart key device (INSKD) 522. Internal smart key device 522 contains cryptographic engine 524 for performing cryptographic functions using various data items that are stored in internal smart key device 522. INSKD private key 526 is stored in a manner such that it cannot be read or accessed by entities that are external to INSKD 522; INSKD 522 does not contain functionality for transmitting or otherwise providing a copy of INSKD private key 526. INSKD public key certificate 528 contains a copy of INSKD public key 530 that corresponds to INSKD private key 526 as an asymmetric cryptographic key pair. INSKD 522 also contains a copy of EXSKD public key certificate 532, which itself contains a copy of INSKD public key 534 that corresponds to EXSKD private key 512 as an asymmetric cryptographic key pair. The copy of EXSKD public key certificate 532 may be written into INSKD 522 as part of its manufacturing or initialization processes.

In alternative embodiments, INSKD private key 526 and INSKD public key 530 may be used for other functions. In a preferred embodiment as shown in FIG. 5, INSKD private key 526 and INSKD public key 530 are reserved for communications between INSKD 522 and EXSKD 502 while INSKD 522 employs one or more other cryptographic key pairs for other functions. In this example, INSKD_SW private key 536 is used by INSKD 522 for securing communications between INSKD 522 and software smart key unit (SWSKU) 538 in application 540. INSKD_SW public key certificate 542 contains a copy of INSKD_SW public key 544 that corresponds to INSKD_SW private key 536 as an asymmetric cryptographic key pair. INSKD 522 also contains a copy of SWSKU public key certificate 546, which itself contains a copy of SWSKU public key 548 that corresponds to SWSKU private key 550 as an asymmetric cryptographic key pair.

System unit 506 supports execution of application 540 that contains SWSKU 538, which itself contains cryptographic engine 552 for performing cryptographic functions using various data items that are stored in software smart key unit 538. SWSKU 538 does not contain functionality for transmitting or otherwise providing a copy of SWSKU private key 550. SWSKU public key certificate 554 contains a copy of SWSKU public key 556 that corresponds to SWSKU private key 550 as an asymmetric cryptographic key pair. SWSKU 538 also contains a copy of INSKD_SW public key certificate 558, which itself contains a copy of INSKD_SW public key 560 that corresponds to INSKD_SW private key 536 as an asymmetric cryptographic key pair. As explained in more detail further below, SWSKU 538 may be digitally signed. In the example that is shown in FIG. 5, SWSKU 538 contains digital signature 562 that has been computed over SWSKU 538 using INSKD_SW private key 536; in other words, INSKD 522 has digitally signed SWSKU 538 using INSKD_SW private key 536.

Figure 6:
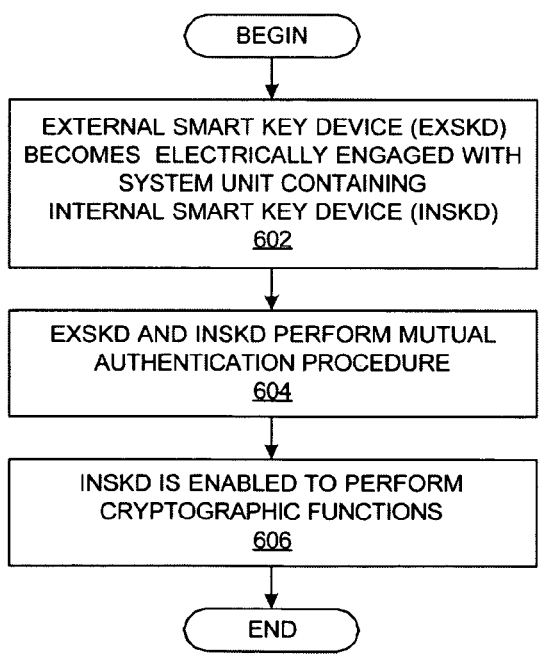
FIG. 6 depicts a flowchart that shows an overview of a process for enabling the cryptographic functionality of the internal smart key device of a host system.

With reference now to FIG. 6, a flowchart depicts an overview of a process for enabling the cryptographic functionality of the internal smart key device of a host system. The process commences when, during a block 602, the external smart key device is electrically engaged with a system unit that includes an internal smart key device. For example, an IT administrator may insert the external smart key device into a receiving unit that includes a slot for receiving the external smart key device. The internal smart key device and the external smart key device then, during a block 604, perform a mutual authentication procedure, after which, during a block 606, the internal smart key device is enabled to perform cryptographic functions, and the process is concluded. It may be assumed that any error in the mutual authentication procedure results in the continued disablement of the internal smart key device. In a less restrictive embodiment, the cryptographic functions of the internal smart key device may then be invoked by any application that is running on the host system. In a more restrictive embodiment, the cryptographic functions of the internal smart key device may be invoked only by an application that includes a software smart key unit, as shown in FIG. 7.

Figure 7:
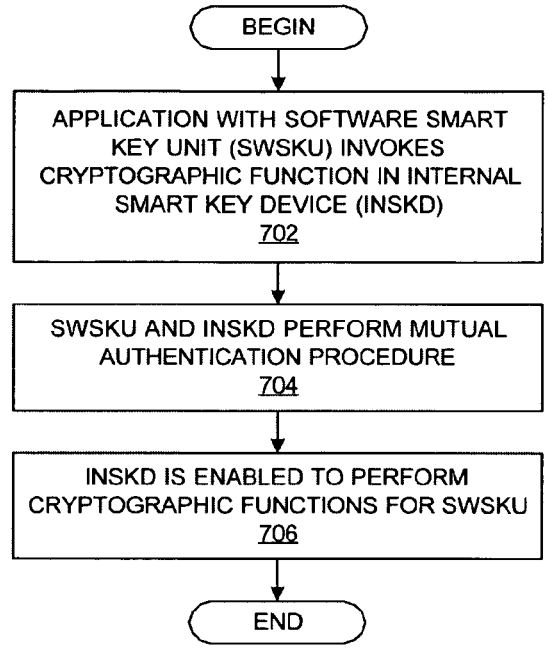
FIG. 7 depicts a flowchart that shows an overview of a process for enabling the cryptographic functionality of the internal smart key device of a host system for use by a particular software smart key unit.

With reference now to FIG. 7, a flowchart depicts a process for enabling the cryptographic functionality of the internal smart key device of a host system for use by a particular software smart key unit in accordance with an embodiment of the present invention. The process commences when, during a block 702, an application or an applet containing a software smart key unit invokes a cryptographic function of the internal smart key device, e.g., through an application programming interface (API). The internal smart key device and the software smart key unit then, during a block 704, perform a mutual authentication procedure, after which, during a block 706, the internal smart key device is enabled to perform cryptographic functions for the software smart key unit, and the process is concluded. Assuming that multiple software smart key units on a host system have completed a mutual authentication procedure with the internal smart key device, then the internal smart key device may be simultaneously enabled to perform cryptographic functions on behalf of the multiple software smart key units.

While the external smart key device remains engaged with the system unit containing the internal smart key device, the internal smart key device is enabled to provide functionality to act as a certificate authority, i.e. generate new public certificates. In one embodiment, the external smart key device should be engaged with the system unit containing the internal smart key device when installing a new software package. A new public certificate may be issued to the new software package during the software installation; the private key that corresponds to the public key in the newly issued digital certificate may be embedded within the software package, and the private key may be protected by having the internal smart key device sign the software package. Furthermore, in a Java® environment, a JAR file and the Java® package in which the private key is embedded may be further sealed to prevent a malicious user from tampering with the private key.

Figure 8:
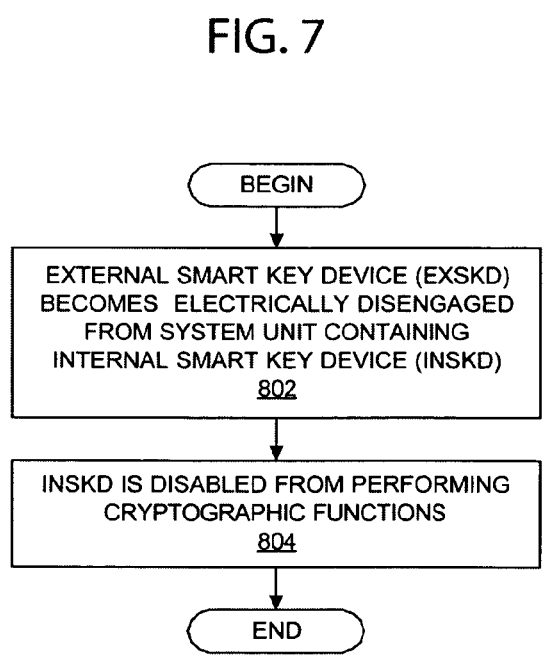
FIG. 8 depicts a flowchart that shows a process for disabling the cryptographic functionality of the internal smart key device of a host system.

With reference now to FIG. 8, a flowchart depicts a process for disabling the cryptographic functionality of the internal smart key device of a host system in accordance with an embodiment of the present invention. The process commences, during a block 802, when the external smart key device is electrically disengaged from the system unit containing the internal smart key device, e.g., at some subsequent point in time after the external smart key device had been inserted and the internal smart key device had been enabled. When the system unit detects the disengagement of the external smart key device, then, during a block 804, the internal smart key device becomes disabled from further performing cryptographic functions, and the process is concluded.

The process that is shown in FIG. 8 operates as a complementary process to either of the processes that are shown in FIG. 6 or FIG. 7. It should be noted, though, that the internal smart key device may still perform some functions such that it is not completely disabled, depending on the implementation of the present invention. It may be assumed that the cryptographic functionality in the internal smart key device may be enabled or disabled through software or hardware. For example, in a hardware mode, the operation of particular circuitry in the internal smart key device might be prevented from entering an operable state by certain flip-flops or other mechanisms that must be set or cleared based on an enablement state that represents whether the external smart key device has been accepted; in a software mode, the operation of certain cryptographic functions may be protected by setting and clearing special enablement flags that logically control the execution of the cryptographic functions.

Figure 9A:
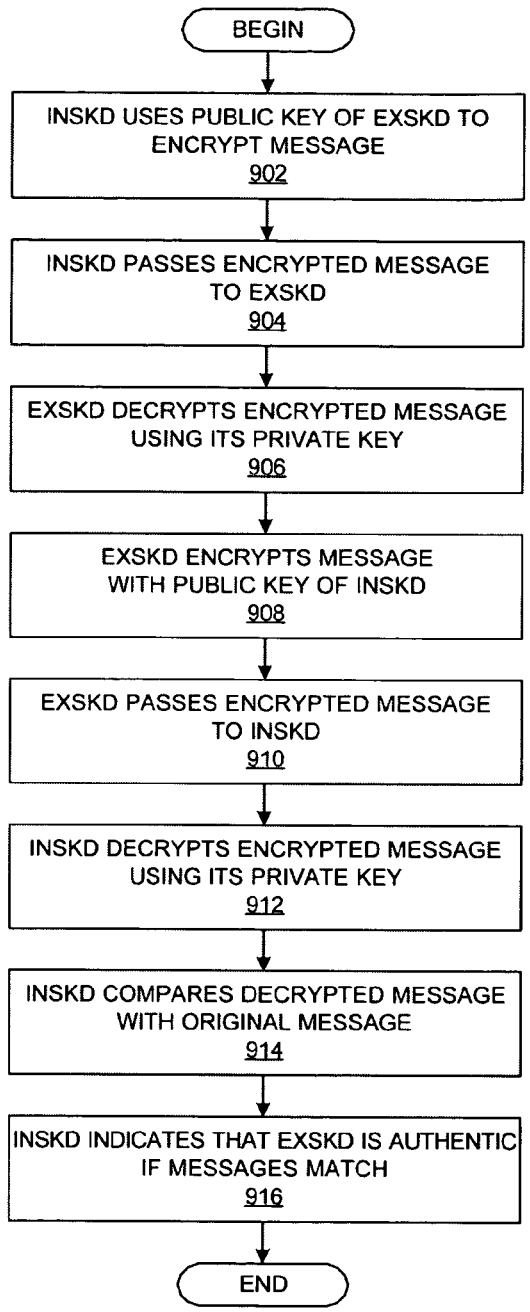
FIGS. 9A-9B depict a pair of flowcharts that show further detail for the mutual authentication procedure that is shown in block 604 of FIG. 6.
Figure 9B:
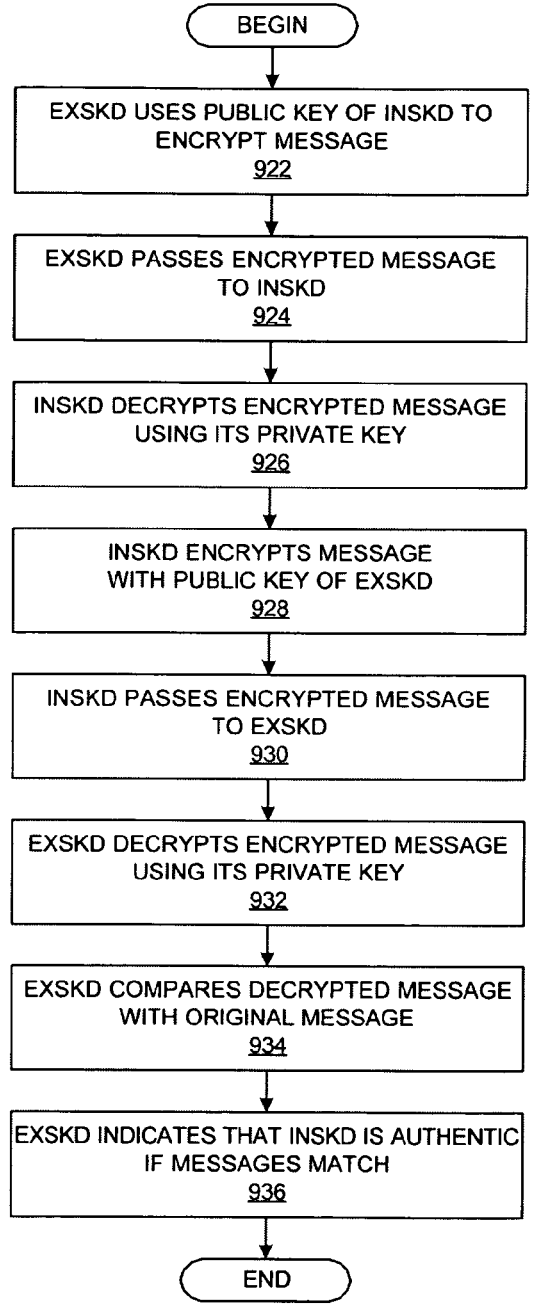

With reference now to FIGS. 9A-9B, a pair of flowcharts depict further detail for the mutual authentication procedure that is shown in block 604 of FIG. 6. FIG. 9A depicts the process for the internal smart key device to authenticate the external smart key device, while FIG. 9B depicts the process for the external smart key device to authenticate the internal smart key device. The process that is shown in FIG. 9A may be performed prior to the process that is shown in FIG. 9B or vice versa; depending on the manner in which the present invention is implemented, the processes may be independent and/or may be performed simultaneously, e.g., through appropriate signals or status flags that indicate the operations that are being attempted.

Referring now to FIG. 9A, the process commences when, during a block 902, the internal smart key device uses the public key of the external smart key device to encrypt a message, e.g., a random text string. The internal smart key device, through the appropriate interface of the host system, during a block 904, transfers the encrypted message to the external smart key device, which then, during a block 906, decrypts the encrypted message with its private key. The external smart key device then, during a block 908, encrypts the decrypted message with the public key of the internal smart key device and passes, during a block 910, the encrypted message to the internal smart key device. The internal smart key device then, during a block 912, decrypts the encrypted message with its private key and, during a block 914, compares the received message with its original message. If the two messages match, then, during a block 916, the internal smart key device provides an indication, e.g., with an appropriate signal or by setting a logical flag variable, that the internal smart key device has determined that the external smart key device is authentic, thereby concluding the process.

Referring now to FIG. 9B, the process commences, during a block 922, when the external smart key device uses the public key of the internal smart key device to encrypt a message, e.g., a random text string. During a block 924, The external smart key device transfers the encrypted message to the internal smart key device, which then, during a block 926, decrypts the encrypted message with its private key. The internal smart key device then, during a block 928, encrypts the decrypted message with the public key of the external smart key device and, during a block 930, passes the encrypted message to the external smart key device. The external smart key device then, during a block 932, decrypts the encrypted message with its private key and, during a block 934, compares the received message with its original message. If the two messages match, then, during a block 936, the external smart key device provides an indication, e.g., with an appropriate signal or by setting a logical flag variable, that the external smart key device has determined that the internal smart key device is authentic, thereby concluding the process.

With reference now to FIGS. 10A-10B, a pair of flowcharts depicts further detail for the mutual authentication procedure that is shown in block 704 of FIG. 7. FIG. 10A depicts the process for the software smart key unit to authenticate the internal smart key device, while FIG. 10B depicts the process for the internal smart key device to authenticate the software smart key unit. The process that is shown in FIG. 10A may be performed prior to the process that is shown in FIG. 10B or vice versa; depending on the manner in which the present invention is implemented, the processes may be independent and/or may be performed simultaneously, e.g., through appropriate messages or status flags that indicate the operations that are being attempted.

Referring now to FIG. 10A, the process commences, during a block 1002, when the software smart key unit uses the public key of the internal smart key device to encrypt a message, e.g., a random text string. During a block 1004, the software smart key unit transfers the encrypted message to the internal smart key device, which then, during a block 1006, decrypts the encrypted message with its private key. The internal smart key device then, during a block 1008, encrypts the decrypted message with the public key of the software smart key unit and, during a block 1010, passes the encrypted message to the software smart key unit. The software smart key unit then, during a block 1012, decrypts the encrypted message with its private key and compares, during a block 1014, the received message with its original message. If the two messages match, then, during a block 1016, the software smart key unit provides an indication, e.g., with an appropriate message or by setting a logical flag variable, that the software smart key unit has determined that the internal smart key device is authentic, thereby concluding the process.

In contrast to FIG. 10A, FIG. 10B illustrates the use of a session key instead of a random text string as the message that is passed between the two entities. The session key is to be used for securing subsequent message traffic during a session between the two entities if the mutual authentication process between the two entities is successfully completed; the session may be timed, or the session may terminated by a particular event, such as the termination of the execution of a software entity or the power shutdown of a hardware entity. The session key may be placed within a larger message containing other information prior to encryption, whereafter the encrypted message is passed between the two entities. In an alternative embodiment, a random text string may be used for the authentication procedure, after which the two entities may exchange a session key. As explained in more detail further below, additional information may be securely passed between the two entities during the authentication process to reduce the number of actions that are used to exchange information.

Referring now to FIG. 10B, during a block 1022, the process commences when the internal smart key device uses the public key of the software smart key unit to encrypt a session key. During a block 1024, the internal smart key device transfers the encrypted session key to the software smart key unit, which then, during a block 1026, decrypts the encrypted session key with its private key. The software smart key unit then, during a block 1028, encrypts the decrypted session key with the public key of the internal smart key device and, during a block 1030, passes the encrypted session key to the internal smart key device. The internal smart key device then, during a block 1032, decrypts the encrypted session key with its private key and, during a block 1034, compares the received session key with its original session key. If the two versions of the session key match, then, during a block 1036, the internal smart key device provides an indication, e.g., with an appropriate message or by setting a logical flag variable, that the internal smart key device has determined that the software smart key unit is authentic, thereby concluding the process.

Additional security actions may be performed in conjunction with the process that is shown in FIG. 7. For example, at block 702, an application or an applet has requested the use of functionality embedded in the internal smart key device. At some point in time, prior to starting the process that is shown in FIG. 10B, the internal smart key device may perform an additional action of verifying whether the software smart key unit in the requesting application or applet contains secure code. As mentioned above with respect to FIG. 5, SWSKU 538 may be digitally signed; SWSKU 538 contains digital signature 562 that has been computed over SWSKU 538 using INSKD_SW private key 536. Hence, the internal smart key device may verify whether or not the software smart key unit in the requesting application or applet contains secure code by verifying the digital signature associated with the software smart key unit.

In a Java® environment, the software smart key unit may be implemented as a signed JAR file; in one embodiment, the internal smart key device is used to verify the digital signature of the signed JAR file. In a different embodiment, the JAR file and the Java® package may be further sealed so that the class loader would enforce that all code in the package should be loaded from the sealed JAR file. The act of sealing the JAR file and the Java® package can prevent functionality from being modified by malicious users via injecting code into the class path. Moreover, the class loader itself may be signed and sealed such that the integrity of the class loader can be verified.

In a more generic computational environment, while internal smart key device may digitally sign a software smart key unit and later validate the digital signature, the process of ensuring that the software smart key unit is signed and validated may be controlled by an appropriate operating system module within the data processing system with assistance from the internal smart key device, e.g., a program loader that loads software modules for execution. Prior to allowing the software module to execute, the program loader could perform additional security processes. Moreover, the program loader itself may be signed and sealed such that the integrity of the program loader can be verified.

Although the above-mentioned process provides a mechanism for ensuring the integrity of the software smart key unit, the operations of the software smart key unit within a data processing system may still be regarded as somewhat vulnerable because its cryptographic keys may be viewed and copied by inspecting the code that comprises the software smart key unit; it may be assumed that the cryptographic keys are stored in the clear within the software smart key unit.

Hence, in order to protect the software smart key unit, in particular its private key, yet another security action may be performed in conjunction with the process that is shown in FIG. 7. At some prior point in time, the software smart key unit can be encrypted, thereby concealing any sensitive information within the software smart key unit, particularly its private key. In a different embodiment, a software module that includes a software smart key unit could be encrypted. For example, when a software module is installed on a data processing system, the internal smart key device on the data processing system could encrypt the software module as part of the installation procedure for the application program that includes the software module.

In a system in which this additional action is performed, then the software smart key unit and/or a software module that includes the software smart key unit would require decryption before it could be executed. At a point in time similar to that described above with respect to protecting the integrity of the software smart key unit using digital signatures, e.g., at some point in time prior to starting the process that is shown in FIG. 10B, the internal smart key device would perform an additional action of decrypting the software smart key unit and/or the software module that includes the software smart key unit. Again, in a manner similar to that described above, the decryption process may be controlled by an appropriate operating system module within the data processing system with assistance from the internal smart key device. Further detail about the process of modifying software modules upon installation for use in conjunction with an internal smart key device and about the process of executing such software modules in a secure manner is provided hereinbelow.

Figure 11A:
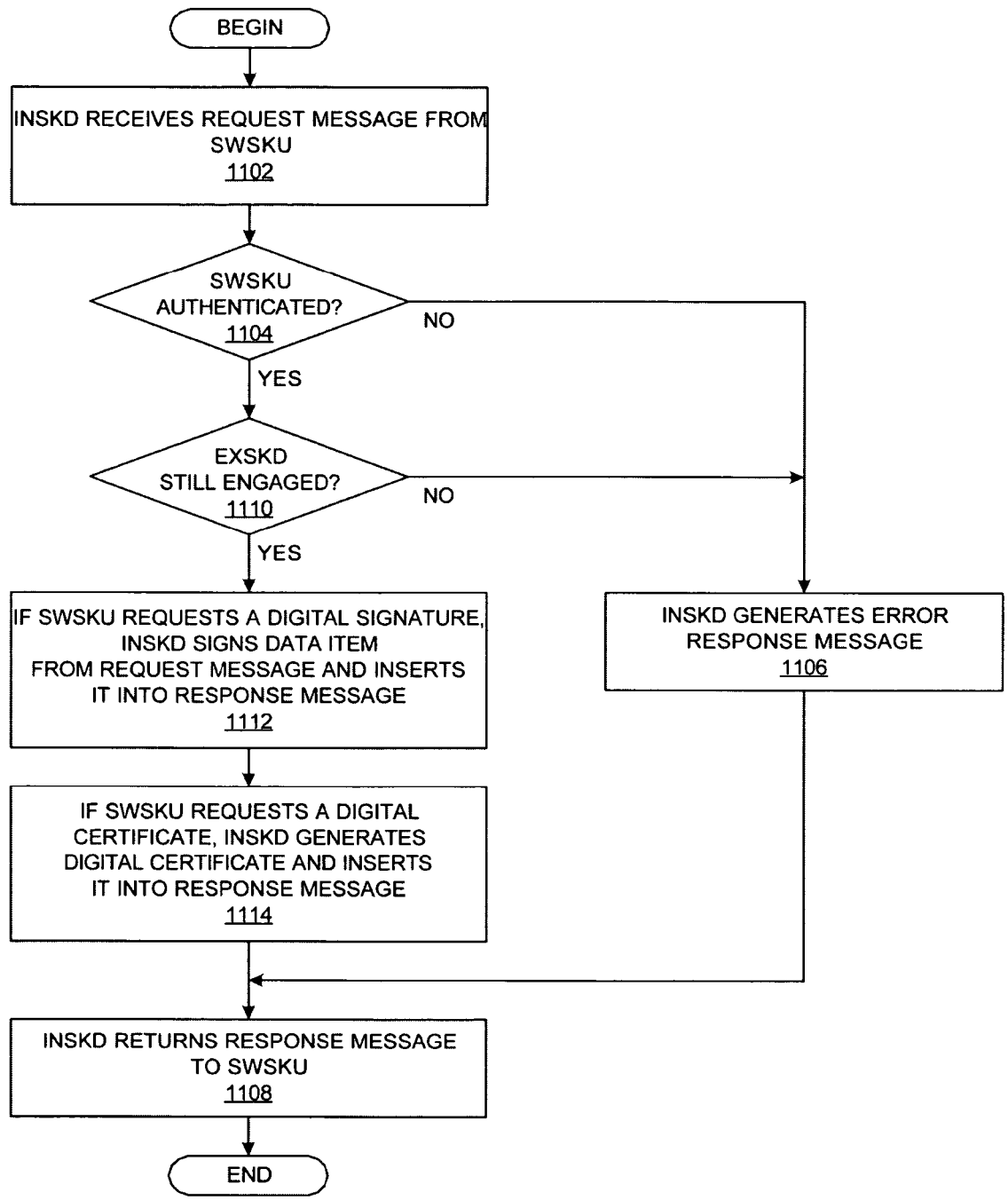
FIG. 11A depicts a flowchart that shows a process in an internal smart key device for performing operations as requested by a software smart key unit in which the operations are enabled or disabled based on the presence of an external smart key device.

With reference now to FIG. 11A, a flowchart depicts a process in an internal smart key device for performing operations as requested by a software smart key unit in which the operations are enabled or disabled based on the presence of an external smart key device. The process commences in a block 1102 when the internal smart key device receives a request message from the software smart key unit; the request message contains a message-type variable that indicates the type of operation that is being requested by the software smart key unit. During a block 1104, a determination is then made as to whether or not the software smart key unit has been authenticated by the internal smart key device; the determination may be performed by successfully decrypting the contents of the received message using the session key that the internal smart key device passed to the software smart key unit during a prior authentication procedure, e.g., as described above with respect to FIG. 10B. If the software smart key unit has not been authenticated, then, during a block 1106, the internal smart key device generates an appropriate error response and, during a block 1108, returns the response message to the requesting software smart key unit, thereby concluding the process.

If the software smart key unit has been authenticated, then, during a block 1110, the internal smart key device determines if the external smart key device is still electrically engaged with the system unit. For example, the determination may merely entail checking a special register that would have been cleared had the electrical connection between the system unit and the external smart key device been broken. If the external smart key device is not electrically engaged with the system unit, then the internal smart key device generates an error response at block 1106 and returns the response message to the software smart key unit at block 1108, thereby concluding the process.

If the software smart key unit has been authenticated and the external smart key device is still electrically engaged with the system unit, then the internal smart key device performs the requested function for the software smart key unit, if possible. Block 1112 and block 1114 depict examples of functionality that may be provided by an internal smart key device; the enumeration of these examples does not imply that other functions may not be available in other implementations of the present invention. In a preferred embodiment, the internal smart key device performs the following functions only if the external smart key device remains electrically engaged with the internal smart key device after mutual authentication: issuing new digital certificates while acting as a certificate authority; and signing a software module using a private key of the internal smart key device, wherein the private key corresponds to an available public key certificate. It should be noted that the present invention does not allow any interface for retrieving a private key of the internal smart key device; hence, performing a signing operation using its private key can only be performed by the internal smart key device.

If the software smart key unit has requested a digital signature on a data item that was embedded within the request message, then, during a block 112, the internal smart key device computes a digital signature over the data item using an appropriate private key and inserts the digitally signature (preferably, along with the copy of the data item that it returns) into the response message. If the software smart key unit has requested a digital certificate, then, during a block 1114, the internal smart key device generates a digital certificate using an appropriate private key and inserts the digital certificate into the response message; the digital certificate may include various identifying information that was provided by the software smart key unit within the request message. After the appropriate response message has been generated, which would include encrypting any sensitive data with the appropriate session key, the response message is returned to the software smart key unit at block 1108, and the process is concluded.

Referring again to block 1112, any type of digital data item may be signed. Referring again to FIG. 4, application 408 represents many different types of applications that may incorporate the functionality of the present invention. In one embodiment, the application may be an application server that signs Java® JAR files, either files that have been generated directly by the application server or on behalf of other applications on the host system. In certain cases, a newly generated JAR file may itself contain a software smart key unit that is able to invoke functionality in the internal smart key device of the host system.

Figure 11B:
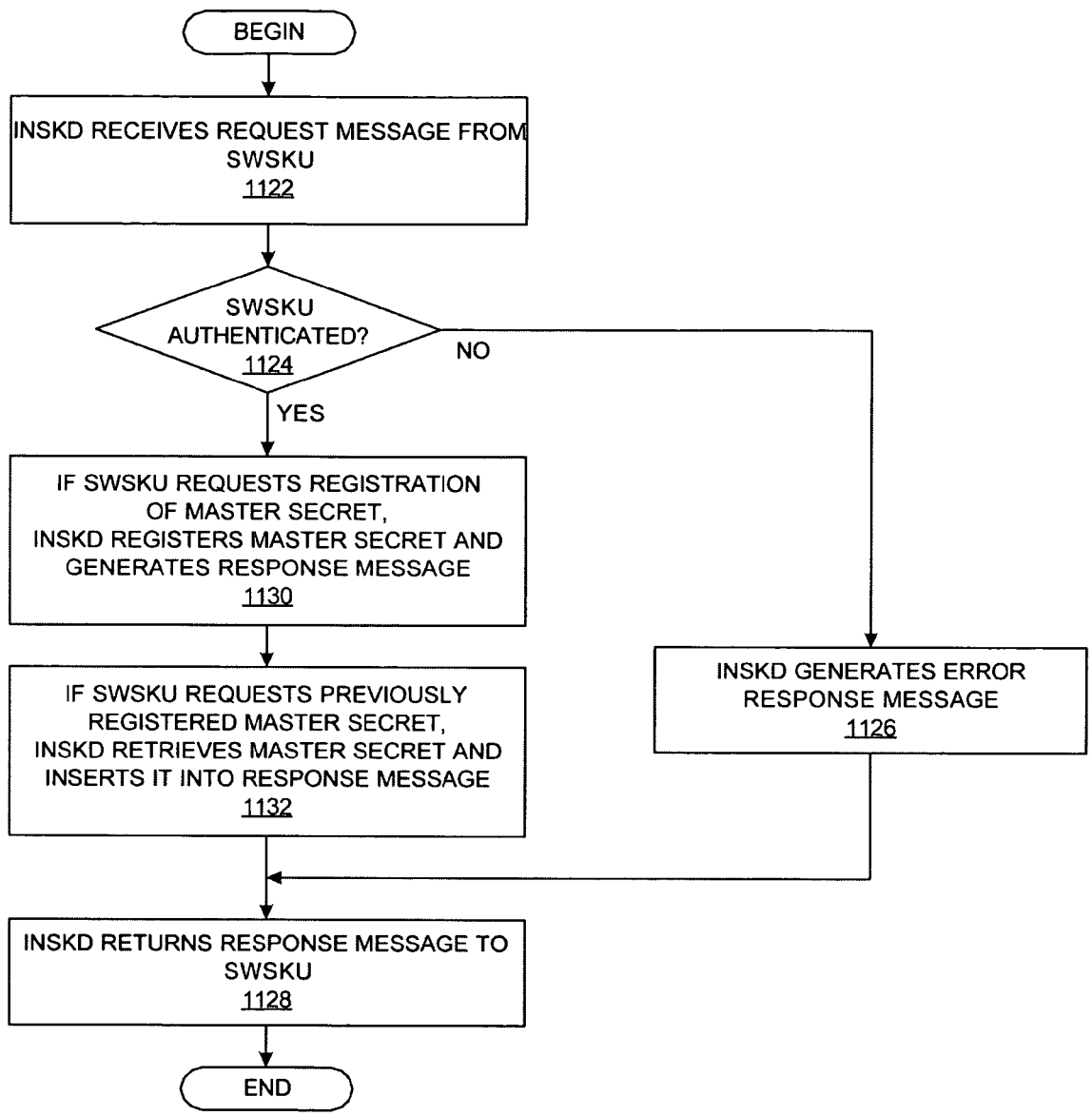
FIG. 11B depicts a flowchart that shows a process in an internal smart key device for performing operations as requested by a software smart key unit in which the operations are not required to be enabled by the presence of an external smart key device.

With reference now to FIG. 11B, a flowchart depicts a process in an internal smart key device for performing operations as requested by a software smart key unit in which the operations are not required to be enabled by the presence of an external smart key device. The process commences in a block 1122 when the internal smart key device receives a request message from the software smart key unit; the request message contains a message-type variable that indicates the type of operation that is being requested by the software smart key unit. A determination is then made, during a block 1124, as to whether or not the software smart key unit has been authenticated by the internal smart key device; the determination may be performed by successfully decrypting the contents of the received message using the session key that the internal smart key device passed to the software smart key unit during a prior authentication procedure, e.g., as described above with respect to FIG. 10B. If the software smart key unit has not been authenticated, then, during a block 1126, the internal smart key device generates an appropriate error response and, during a block 1128, returns the response message to the requesting software smart key unit, thereby concluding the process.

If the software smart key unit has been authenticated, then the internal smart key device performs the requested function for the software smart key unit, if possible. A block 1130 and a block 1132 depict examples of functionality that may be provided by an internal smart key device; the enumeration of these examples does not imply that other functions may not be available in other implementations of the present invention. In a preferred embodiment, the following functions would be performed by an internal smart key device without the presence of an external smart key device: encryption and decryption given the required keys; validating a digital signature given the certificate; mutually authenticating a software smart key unit; and allowing stored sensitive information to be read/write accessed by a mutually authenticated software smart key unit.

If the software smart key unit has requested the registration of a master secret that was embedded within the request message, then, during a block 1130, the internal smart key device stores the master secret in association with some identifying information for the software smart key unit and generates a response message. If the software smart key unit has requested the retrieval of a previously registered master secret, then, during a block 1132, the internal smart key device retrieves the master secret based on the identity of the software smart key unit and generates a response message. After the appropriate response message has been generated, which would include encrypting any sensitive data with the appropriate session key, the response message is returned to the software smart key unit at block 1128, and the process is concluded.

In this manner, it is only necessary to keep an external smart key device electrically engaged with the internal smart key device if particularly sensitive operations need to be performed by the internal smart key device, such as issuing digital certificates. As described with respect to FIG. 11B, a software smart key unit can save sensitive information, such as cryptographic keys, in the internal smart key device after the software smart key unit has mutually authenticated with the internal smart key device without requiring the presence of an external smart key device; the sensitive information can only be retrieved by the same software smart key unit.

This approach is advantageous because the software smart key unit can mutually authenticate with the internal smart key device in a manner that is independent from the external smart key device. For example, this approach allows starting a software program in an unattended mode, i.e. no human to insert the external smart key device; the program may use a previously signed and sealed software smart key unit to retrieve any sensitive information from the internal smart key device. The software program may retrieve a master secret from the internal smart key device to decrypt passwords and other encrypted configuration information to complete the start-up process securely without human intervention.

Figure 12:
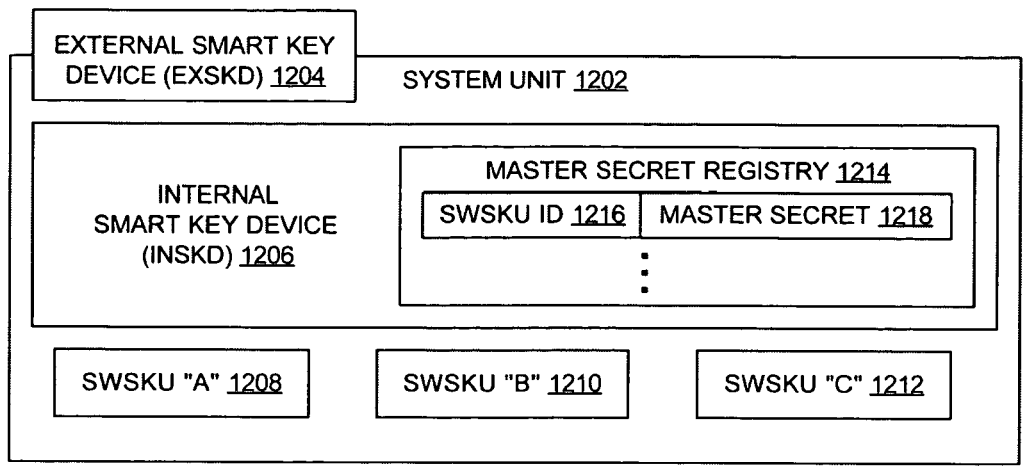
FIG. 12 depicts a block diagram that shows an embodiment of the present invention for protecting master secrets.

With reference now to FIG. 12, a block diagram illustrates an embodiment of the present invention for protecting master secrets. As noted above, secret information that is stored on a data processing system may be encrypted with a master secret, which necessitates the need to protect the master secret. In prior art system, the protection of the master secret is typically protected through mechanisms that are external to the host system on which the master secret is being used. In contrast to a typical prior art system, an embodiment of the present invention may be used to protect master secrets on the host system in which the master secrets will be used.

FIG. 12 is similar to FIG. 4; system unit 1202 interfaces with external smart key device 1204, and system unit 1202 also contains internal smart key device 1206. System unit 1202 also supports software smart key units 1208-1212. In contrast to FIG. 4, though, internal smart key device 1206 in FIG. 12 has been enhanced to include master secret registry 1214 for securing master secrets, which may be a password, an encryption key, or some other form. As briefly described above with respect to blocks 1130 and 1132 in FIG. 11B, software smart key units 1208-1212 may store a master secret in internal smart key device 1206 through a secure request/response mechanism. Internal smart key device 1206 stores the master secrets from software smart key units 1208-1212 in association with identifying information for the requesting software smart key unit. For example, master secret registry 1214 contains SWSKU identifier 1216 associated with master secret 1218; a lookup operation that might be performed on SWSKU ID 1216 would relate it to master secret 1218. Alternatively, master secret registry 1214 may support more than one master secret per software smart key unit; a group of master secrets may be registered or retrieved with each requested operation as appropriate. Although FIG. 11B only illustrates a registration operation and a retrieval operation, other operations that may be relevant to the management of master secrets, e.g., a deletion operation or an overwrite operation, may also be supported.

As noted above the description of FIG. 10B, additional information may be securely passed between the internal smart key device and the software smart key unit during the authentication process to reduce the number of actions that are used to exchange information. To that end, the master secrets for the software smart key unit may be passed during the authentication process. Since the authentic software smart key unit is the only entity that should have a copy of the software smart key unit's private key, then only the software smart key unit should be able to decrypt the software smart key unit's master secrets that are provided by the internal smart key device during the authentication process.

Figure 13:
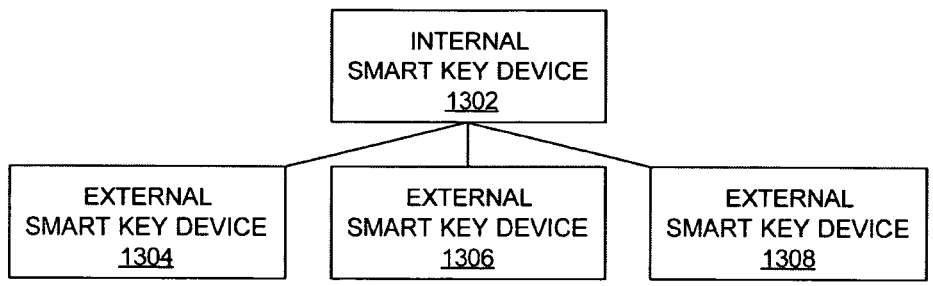
FIGS. 13-15 depict block diagrams that show different relationships between multiple external smart key devices and multiple internal smart key devices.
Figure 14:
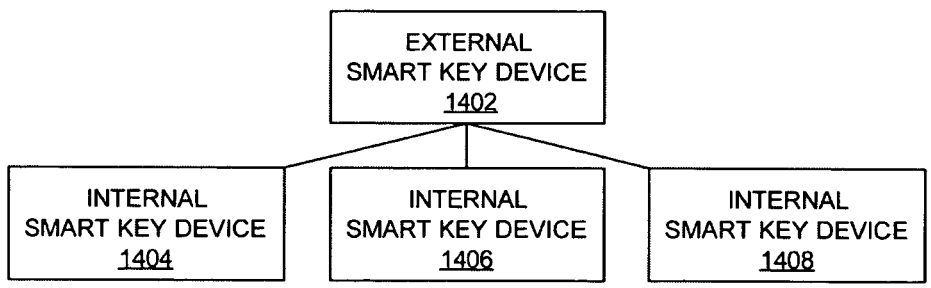
Figure 15:
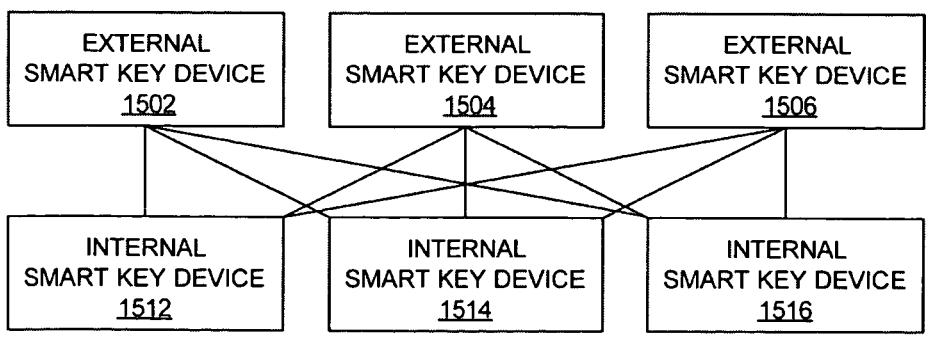

With reference now to FIGS. 13-15, block diagrams illustrate different relationships between multiple external smart key devices and multiple internal smart key devices. The description of the previous figures may appear to imply that the there is a unique one-to-one relationship between an external smart key device and an internal smart key device. Referring to FIG. 13, solitary internal smart key device 1302 may be enabled through the use of any of multiple external smart key devices 1304-1308. For example, each of a small group of IT administrators may have a removable smart key device that may be inserted into a particular server machine that contains internal smart key device 1302. Referring to FIG. 14, solitary external smart key device 1402 may enable any of multiple internal smart key devices 1404-1408. For example, an IT administrator may use a single removable smart key device on multiple server machines, each of which contains only one of internal smart key devices 1404-1408. Referring to FIG. 15, multiple external smart key devices 1502-1506 may enable any of multiple internal smart key devices 1512-1516. For example, each of a small group of IT administrators may have a removable smart key device that may be inserted into many different server machines, each of which contains only one of internal smart key devices 1512-1516. In order to support a many-to-one relationship or a one-to-many relationship on a given smart key device, the given smart key device only requires the storage or configuration of additional public key certificates for the additional corresponding internal smart key devices and/or external smart key devices.

Before discussing additional embodiments for the present invention, some background information about trust relationships based on digital certificates is provided for evaluating the operational efficiencies and other advantages of the additional embodiments of present invention.

Figure 16A:
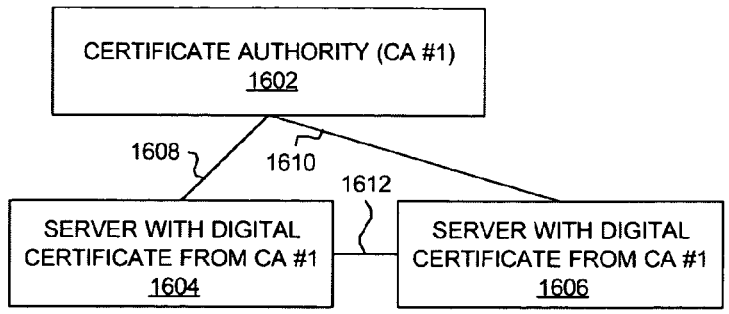
FIGS. 16A-16C depict block diagrams that show a typical set of trusted relationships.
Figure 16B:
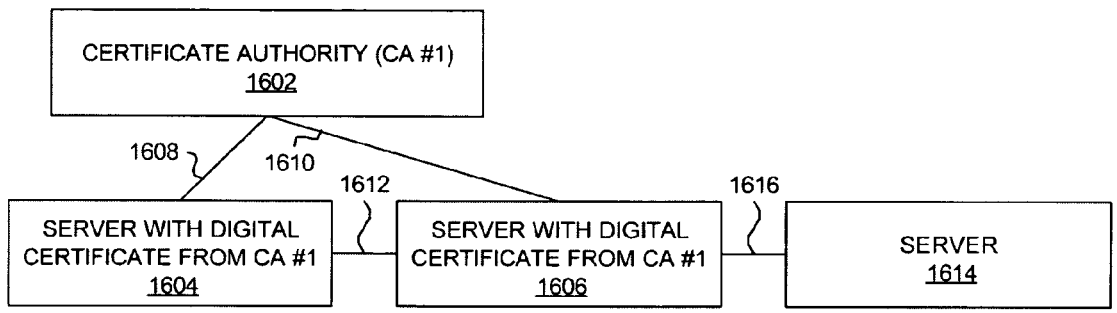
Figure 16C:
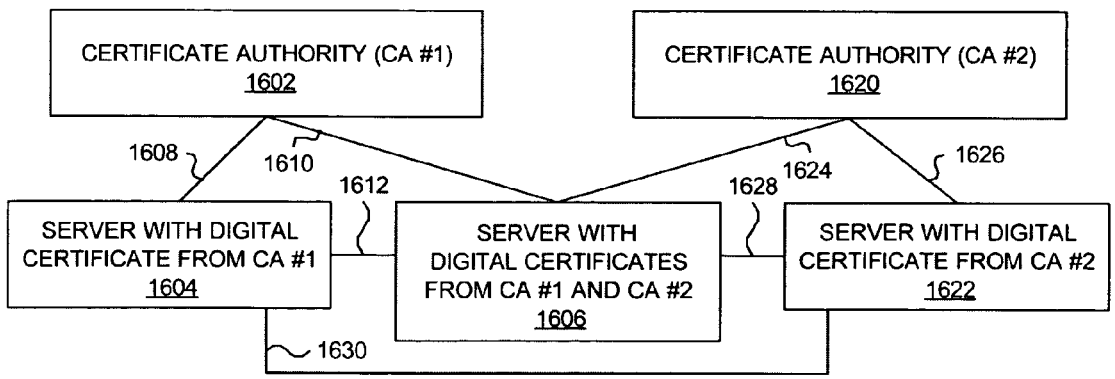

With reference now to FIGS. 16A-16C, each block diagram depicts a typical set of trusted relationships. Referring now to FIG. 16A, certificate authority 1602 has issued digital certificates to servers 1604 and 1606. As noted above, a certificate authority is a trusted entity that issues digital certificates on behalf of other entities, possibly human users but possibly on behalf of programmatic entities or hardware entities, such as applications or data processing devices. Thus, servers 1604 and 1606 may have been represented by users, such as users 202 or 302 shown in FIG. 2 or FIG. 3; alternatively, servers 1604 and 1606 may be some other type of programmatic entities, such as application 408 shown in FIG. 4. The certificate authority 1602 has issued digital certificates to servers 1604 and 1606. Servers 1604 and 1606 can establish trust relationships 1608 and 1610 with the certificate authority 1602 subsequently by performing mutual authentication with the certificate authority 1602 as described by this invention. At some point in time, server 1604 may present its digital certificate to server 1606 along with proof-of-possession of the corresponding private key, e.g., a data item that has been signed using its private key, while requesting a service that is provided by server 1606. Because server 1606 trusts certificate authority 1602, server 1606 is able to authenticate server 1604 by verifying that the digital certificate which was received from server 1604 was signed by certificate authority 1602. The reverse situation is also true, and server 1604 would be able to authenticate server 1606. In this manner, server 1604 and server 1606 are able to establish trust relationship 1612 between themselves.

Referring to FIG. 16B, server 1614 has established trust relationship 1616 with server 1606. In this example, no basis is provided for trust relationship 1616, and server 1604 has not accepted trust relationship 1616 with server 1614.

Referring to FIG. 16C, similar reference numerals refer to similar elements as shown in FIG. 16A; FIG. 16C, though, shows additional elements to those shown in FIG. 16A. Certificate authority 1620 has issued digital certificates to servers 1606 and 1622. Given that certificate authority 1620 has issued digital certificates to servers 1606 and 1622, certificate authority is said to have established trust relationships 1624 and 1626 with servers 1606 and 1622, respectively. At some point in time, server 1622 may present its digital certificate to server 1606 while requesting a service that is provided by server 1606. Because server 1622 trusts certificate authority 1620, server 1606 is able to authenticate server 1622 by verifying that the digital certificate which was received from server 1622 was signed by certificate authority 1620. The reverse situation is also true, and server 1622 would be able to authenticate server 1606. In this manner, server 1622 and server 1606 are able to establish trust relationship 1628 between themselves.

Trust relationships may be transitive. As noted above with respect to FIG. 16B, server 1606 had established trust relationship 1616 with server 1614. However, server 1604 did not recognize trust relationship 1616, possibly because server 1606 was not able to provide sufficient information about the basis for trust relationship 1616. In FIG. 16C, though, server 1606 is able to provide sufficient information about its trusted relationships among the servers with which server 1606 has established trust relationships. In this example, server 1606 provides information about trust relationship 1628 to server 1604. Given trust relationship 1612 between server 1604 and server 1606 and trust relationship 1628 between server 1606 and server 1622, server 1604 and server 1622 are able to establish transitive trust relationship 1630 between server 1604 and server 1622. The servers may transfer certificates in accordance with the certificate management protocols that were mentioned above.

In this manner, the servers are able to form complex, hierarchical, trust relationships between themselves and the certificate authorities. Each certificate authority may be considered as the root of a tree structure; a certificate authority is sometimes referred to as the root authority, especially when other entities within a tree structure also act as secondary certificate authorities. The use of multiple root certificate authorities allows multiple tree structures to overlap, e.g., as shown in FIG. 16C. Turning back now to the present invention, the remaining figures depict examples of embodiments of the present invention in which the present invention is implemented to construct a trust model using the advantages of the internal and external smart key devices that have been described above.

With reference now to FIG. 17, a block diagram depicts an example of a trust model that is constructed of trust relationships that are based on the trust provided by internal smart key devices in accordance with an embodiment of the present invention. The internal smart key devices of the present invention provide a high level of trustworthiness in acting as a certificate authority. As described above with respect to other figures, the internal smart key device provides a mechanism for securing information. As described with respect to FIG. 11, one of the functions that may be provided by an internal smart key device is the issuance of digital certificates. Since the internal smart key device would be implemented as part of a system unit within a data processing system, e.g., such as a specialized chip on a motherboard, the internal smart key device should be protected physically, thereby making it difficult for malicious users to implement improper schemes. In addition, the trustworthiness of an internal smart key device is enhanced by the fact that the issuance of digital certificates by the internal smart key device may be controlled by a system administrator through the use of an external smart key device. Hence, the ability of an internal smart key device to issue digital certificates allows an internal smart key device to act as the foundation for a trust model.

In this manner, different types of entities, e.g., different kinds of hardware and software computing resources, are able to form complex, hierarchical, trust relationships between themselves and the internal smart key devices acting as hardware-based certificate authorities. In this trust model, trust is rooted in the certificate authority functionality that is provided by an internal smart key device on a data processing system. The trust relationship hierarchy may be represented, as in FIG. 17, by an inverted pyramid in which the internal smart key device is at the apex of the inverted pyramid, and the computing resources form the inverted pyramid. In a distributed data processing environment, the trust relationships may be viewed as a collection of overlapping inverted pyramids where each pyramid is based on the internal smart key device on each machine, as shown in FIG. 17.

In FIG. 17, an example of a trust model shows two internal smart key devices 1702 and 1704, which include certificate authority modules 1706 and 1708, respectively, that contain functionality for allowing each internal smart key device to act as a certificate authority. Internal smart key device 1704 has issued a certificate to secondary software certificate authority module 1710, which is a software application executing on the same system unit on which internal smart key device 1704 resides. Hierarchically superior software certificate authority modules within the data processing system, such as secondary software certificate authority module 1710, derive authority from a hierarchically inferior software certificate authority within the trust hierarchy, such as the root trust that is provided by the certificate authority functionality of the internal smart key device on the data processing system, i.e., internal smart key device 1704. For example, internal smart key device 1704 may sign the digital certificate of secondary software certificate authority module 1710, which uses the corresponding private key to sign the digital certificates that it issues. In this manner, secondary software certificate authority module 1710 acts as a subordinate certificate authority to internal smart key device 1704, which would be reflected in certificate chains which are rooted by internal smart key device 1704. In another example, internal smart key device 1704 may sign a subordinate software certificate authority module, which itself may sign another subordinate software certificate authority module.

Internal smart key device 1702 has issued digital certificates to entities 1712-1718, while secondary software certificate authority 1710 has issued digital certificates to entities 1722-1728, thereby establishing trust relationships between certificate issuers and the certificate issuees; entities 1712-1718 and entities 1722-1728 may be applications or some other type of programmatic entity. In addition, secondary software certificate authority 1710 has issued a digital certificate to entity 1716, thereby establishing a trust relationship between those two entities.

While FIG. 17 represents a trust model in which all of the computing resources may comprise certificate-handling functionality for authenticating themselves with each other, these computing resources need to be configured to include the certificate-handling functionality. For example, if the different entities in FIG. 17 represent software applications, these software applications need to include a module that has been provided a unique public key certificate and that bears a unique corresponding private key.

For example, each computing resource that is to act independently such that it requires the ability to perform authentication operations with other resources may have an embedded software smart key unit, e.g., in the manner shown in FIG. 5 in which application 540 contains SWSKU 538. Application 540 contains SWSKU 538 which includes SWSKU private key 550; SWSKU public key certificate 554 contains a copy of SWSKU public key 556 that corresponds to SWSKU private key 550 as an asymmetric cryptographic key pair. SWSKU 538 also contains a copy of INSKD_SW public key certificate 558. Hence, application 540 is part of a trust hierarchy that is rooted in INSKD 522. Using the information that is embedded within SWSKU 538 and the functional abilities of SWSKU 538, application 540 is able to authenticate with any other computing resource that also trusts INSKD 522. Thus, in order to implement a trust model in which all of the computing resources may comprise certificate-handling functionality for authenticating themselves with each other in accordance with the present invention, a system administrator needs to ensure that each computing resource comprises an internal smart key device, if the computing resource is a data processing device, or comprises a software smart key unit, if the computing resource is a programmatic entity.

However, in the example shown in FIG. 5, SWSKU 538 came to be embedded in application 540 in some manner. Various processes may be used to embed the required functionality in each of the programmatic resources, as described hereinbelow.

With reference now to FIG. 18, a block diagram depicts a data processing system for generating operating system files in which each programmatic entity in the operating system contains functionality for establishing trust relationships in a trust hierarchy based on internal smart key devices in accordance with an embodiment of the present invention. FIG. 18 is similar to FIG. 4; system unit 1802 interfaces with external smart key device 1804, and system unit 1802 also contains internal smart key device 1806.

In this example, operating system installation application 1808 is responsible for installing operating system files on a machine that includes system unit 1802. During the installation procedure, operating system installation application 1808 reads operating system files 1812 from the distribution medium, such as magnetic tape or CD-ROM, and generates fully operable modules 1814, as explained in more detail hereinbelow.

It should be noted that although FIG. 18 depicts an example in which actions are performed with respect to operating system files, an alternative embodiment is applicable to any type of application file. For example, operating system installation application 1808 may be generalized to be described as an installation application for any given software application, and the given software application may be represented by generic application files that are similar to operating system files 1812. After the installation process is completed, the installation application has generated application files with certificate-bearing software smart key units that are similar to signed operating system files 1814.

Whereas FIG. 18 depicts an example of a system in which all operating system files are secured so that only properly installed operating system modules may be executed on system unit 1802, the alternative embodiment that is mentioned above could restrict execution of all software within the system. Using an appropriate installation process for each installed application, each application module may be secured. In this manner, system unit 1802 may restrict software execution only to software modules that have been installed on the system through a process that is controlled by the presence of an external smart key device. In a Java®-based implementation of the present invention, all Java® applications may be required to contain a software smart key unit that is placed into the application during an installation process; as mentioned above, all JAR files and Java® packages may be sealed so that the class loader would enforce that all code in the package should be loaded from a sealed JAR file.

With reference now to FIG. 19, a flowchart depicts a process for generating operating system modules that contain software smart key units such that the operating system modules are able to perform authentication operations with each other in accordance with an embodiment of the present invention. The process begins in a block 1902 with an operating system installation application checking whether there is at least one additional operating system module that has not yet been processed. If not, then the process is concluded. If so, then, during a block 1904, the operating system installation application reads an operating system module from a distribution medium. For example, referring again to FIG. 18, the operating system modules on the distribution medium is not complete; the operating system modules may not be installed without further processing. Operating system modules 1812 incorporate stub routines or empty modules in the form of distribution versions of the operating system files; if these operating system files are installed and then executed without further modification, the operating system services would not be able to perform authentication operations, thereby causing the operating system to be inoperable.

Hence, after the operating system installation application has read an operating system module 1812 from the distribution medium, such as magnetic tape or CD-ROM, the operating system installation application deletes, during a block 1906, the stub routines or empty modules from the operating system module that is currently being processed. During a block 1908, the operating system installation application generates an asymmetric cryptographic key pair and then, during a block 1910, requests the internal smart key device on the local system unit to issue a digital certificate based on the newly generated key pair on behalf of the operating system module that is currently being processed. In this manner, the SWSKU of the operating system installation application impersonates the entity on behalf of which the digital certificate is being requested and issued; alternatively, a software certificate authority function within the operating system installation application may issue the digital certificate, thereby requiring the public key certificate of the software certificate authority along with the public key certificate of the internal smart key device to become part of the certificate chain of the entity on behalf of which the digital certificate is being requested and issued. It may be assumed that the operating system installation operation is controlled by a system administrator who possesses an external smart key device; by engaging the external smart key device with the system unit during the operating system installation procedure, the system administrator enables the internal smart key device to issue digital certificates, thereby preventing the installation procedure from being spoofed in some manner by a malicious user. It may also be assumed that each operating system module has a unique identifier within a namespace that covers all of the operating system modules such that the unique identifier may be incorporated into the digital certificate.

The operating system installation application then, during a block 1912, generates an instance of a software smart key unit. The newly generated SWSKU incorporates the unique private key that was generated by the operating system installation application on behalf of the new SWSKU. The new SWSKU also incorporates the public key certificate that corresponds to the private key that was issued by the local INSKD; in addition, any other public key certificates that form part of the digital certificate chain for the new SWSKU may also be included. Certificate chains represent a trust path through a trust hierarchy. Although public key certificates are generally freely given and freely obtainable, building a certificate chain can be computationally expensive; thus, the inclusion of any digital certificates that the new SWSKU may need to represent its certificate chain allows the new SWSKU, when executing, to quickly present its certificate chain during an authentication operation, thereby making the authentication operation more efficient.

The operating system installation application then, during a block 1914, generates a fully operable module, such as one of modules 1814 in FIG. 18, by embedding the new SWSKU into the operating system module that is currently being processed, i.e. in place of the removed stubs and empty modules. The process then loops back to block 1902 to check if there are any unprocessed operating system modules, and if not, the process is concluded. As operating system modules are processed, the newly generated SWSKU modules are incorporated into modified operating system modules as necessary. The deployed operating system modules and/or the newly embedded SWSKU modules may also be digitally signed by SWSKU 1810 to show their authenticity.

In this manner, all of the operating system files are enabled to perform authentication operations with embedded functionality for implementing trust relationships. During the operating system installation procedure, INSKD 1806 acts as a certificate authority to issue digital certificates, or alternatively, operating system installation application 1808 acts as a certificate authority to issue digital certificates for modules 1814; in their certificate chains, each module in modules 1814 has its own private key and corresponding public key certificate, the public key certificate of INSKD 1806, and if necessary because it acted as a certificate authority, the public key certificate of the operating system installation application 1808. Thus, each module has a certificate chain that asserts a trust hierarchy that is based on INSKD 1806. In the runtime environment, when a first module in modules 1814 attempts to authenticate to a second module in modules 1814, the first module would present its certificate chain along with proper proof-of-possession, e.g., a digital signature signed by using the corresponding private key, to the second module; because the second module trusts INSKD 1806 on which the first module's certificate chain is based, the second module will authenticate and trust the first module. Because each module in modules 1814 trusts INSKD 1806 and is able to present a certificate chain that relates back to INSKD 1806, each module is able to trust the other similar modules, thereby implementing the trust model as described with respect to FIG. 17.

With reference now to FIG. 20, a block diagram depicts a data processing system for generating project code in which each programmatic entity contains functionality for establishing trust relationships in a trust hierarchy based on internal smart key devices in accordance with an embodiment of the present invention. FIG. 20 is similar to FIG. 4; system unit 2002 interfaces with external smart key device 2004, and system unit 2002 also contains internal smart key device 2006.

In this example, software configuration management (SCM) application 2008 is responsible for managing all code modules and other types of files for a particular project in which a software application is being created. As project files are created by software engineers, the project files are checked into the SCM system, which is able to track versions of the source code in accordance with discrepancy reports and project timelines. The engineers incorporate stub routines or empty modules into the project modules such that preliminary versions of the project modules are able to be tested and integrated without regard to fully implementing authentication considerations.

However, when the need arises to generate a so-called production-level application that may be distributed to customers or otherwise deployed in a production environment, the SCM system removes the stubs and empty modules and replaces them with embedded software smart key units, which are software modules themselves. Hence, at some point in time when the final compilation and linking operations occur, SWSKU 2010 in SCM application 2008 generates asymmetric key pairs along with SWSKU modules containing the newly generated key pairs and corresponding digital certificates. As project modules 2012 are processed, the newly generated SWSKU modules are linked into project modules 2014 as necessary. The production-level project modules 2014 and/or the newly embedded SWSKU modules may also be digitally signed by SWSKU 2010 to show their authenticity.

In this manner, each computing resource within a project application that requires the ability to complete an authentication operation may be provided with a software smart key unit that is able to perform the authentication operation. However, the scenario that is illustrated within FIG. 20 differs significantly from the scenario that is illustrated within FIG. 18. In FIG. 18, the operating system modules 1814 are modified by operating system installation application 1808 on system unit 1802. In a preferred embodiment, the digital certificates that have been issued to the SWSKU's in the modified operating system modules 1816 have been signed by INSKD 1806 on system unit 1802.

Hence, when the modified operating system modules are executing in a runtime environment, the certificate authority that issued the digital certificates for the modified operating system modules is part of the runtime environment. This is not the case in the scenario that is presented in FIG. 20. When the modified project modules are executing in a runtime environment, the digital certificates that are embedded in the SWSKU's of the modified project modules have been signed by the internal smart key device of the system unit on which the production version of the project application was created. In other words, the certificate authority that issued the digital certificates to the SWSKU's in the modified project modules is not part of the runtime environment. When a modified project module attempts to complete an authentication operation with another modified project module, the authentication operation can be completed because each of the modified project modules trusts the internal smart key device of the system unit on which the production version of the project application was created. However, when a modified project module attempts to complete an authentication operation with an operating system module, e.g., one of operating system modules 1814, the authentication operation fails because the operating system module does not trust the internal smart key device that acted as the certificate authority for the operating system module's digital certificate. Therefore, a mechanism is needed for extending the trust relationships in a runtime environment.

With reference now to FIG. 21, a flowchart depicts a process for extending the certificate chain for an internal smart key device in accordance with an embodiment of the present invention. As noted above, some modules that are executing within a runtime environment may have functionality for establishing trust relationships that are based on an internal smart key device that is present within the runtime environment; since the internal smart key device has acted as the certificate authority for these modules, these modules are able to present digital certificate chains that are easily verifiable because the internal smart key device is at the root of the trust hierarchy. When an application is installed into a runtime environment that supports the internal smart key device of the present invention, the application modules may have the functionality for establishing trust relationships between the application modules yet lack the ability to establish trust relationships with other modules in the runtime environment because the root certificate authorities differ; the other modules do not have the ability to trust the digital certificates that are presented by the application modules.

The process that is described with respect to FIG. 21 hereinbelow provides a mechanism for allowing those application modules to establish themselves as trustworthy. The process is preferably performed when the application modules are being installed within a runtime environment that includes an internal smart key device, although the runtime environment can be modified at any time before the application modules are executed within the runtime environment. In this example, though, the application modules do not need to be modified. Thus, the process that is described hereinbelow differs from the process that is described with respect to FIG. 19 in which the modification of the operating system modules was required.

The process commences in a block 2102 when the internal smart key device receives a request message from a software smart key unit in an installation application or some other form of administrative utility application in which the request message indicates a request to assert the root digital certificate of a foreign internal smart key device, i.e. outside of the local runtime environment. For example, the administrative utility application has access to configuration files that accompany the production version of the application modules that have been installed or that are being installed within the local runtime environment. These configuration files contain a copy of the digital certificate that was used by a foreign internal smart key device to generate the digital certificates for the software smart key units that were embedded within the application modules, e.g., in a manner similar to that described with respect to FIG. 20. In other words, the configuration files may be accompanied by a copy of the public key certificate that was used by the foreign internal smart key device of the runtime environment of a vendor that produced the application that is being installed. The request to assert the digital certificate of the foreign internal smart key device is made without the ability of the internal smart key device of the current runtime environment to check for a common trusted entity; since each internal smart key device acts as the root trusted entity within its own trust hierarchy, there is no other common trusted entity on which trust can be founded for the internal smart key device of the current runtime environment and the foreign internal smart key device. Hence, the process of asserting the digital certificate must be a secure procedure that provides the trustworthiness for completing the task.

In order to ensure the trustworthiness of the operation to assert the digital certificate of a foreign internal smart key device, a determination is made, during a block 2104, as to whether or not the software smart key unit of the requesting application has been authenticated by the internal smart key device; the determination may be performed by successfully decrypting the contents of the received message using the session key that the internal smart key device passed to the software smart key unit during a prior authentication procedure, e.g., as described above with respect to FIG. 10B. If the software smart key unit has not been authenticated, then, during a block 2106, the internal smart key device generates an appropriate error response and returns, during a block 2108, the response message to the requesting software smart key unit, thereby concluding the process.

If the software smart key unit has been authenticated, then, during a block 2110, the internal smart key device determines if the external smart key device is still electrically engaged with the system unit. In this manner, the entire procedure is determined to be under the control of a system administrator that has the privilege of performing the procedure. If the external smart key device is not electrically engaged with the system unit, then the internal smart key device generates an error response at block 2106 and returns the response message to the software smart key unit at block 2108, thereby concluding the process.

If the software smart key unit has been authenticated and the external smart key device is still electrically engaged with the system unit, then the internal smart key device performs the requested function for the software smart key unit. During a block 2112, the internal smart key device adds the asserted root certificate of the foreign internal smart key device to a table or a list of trusted root certificates, which possibly contains multiple certificates that have been previously asserted. After the appropriate response message has been created during a block 2114, the response message is returned to the software smart key unit during a block 2108, and the process is concluded.

With reference now to FIG. 22, a block diagram depicts an example of a trust model that is constructed of trust relationships that are based on the trust provided by a single local internal smart key device that maintains a certificate chain containing multiple root certificates for foreign internal smart key devices in accordance with an embodiment of the present invention. As explained with respect to FIG. 5 and other figures, an internal smart key device possesses at least one private key and its corresponding public key certificate; similarly, FIG. 22 shows internal smart key device 2202 containing digital certificate 2204. As explained with respect to FIG. 21, it may be necessary for a system administrator to assert additional root certificates into the trust hierarchy of a particular runtime environment; FIG. 22 shows that digital certificates 2206 and 2208 have been previously asserted and are now stored within internal smart key device 2202 as part of its trusted certificate chain.

As noted above, when application modules are installed into a runtime environment that supports the internal smart key device of the present invention, the application modules may have been provided with the functionality for establishing trust relationships between the application modules yet lack the ability to establish trust relationships with other modules in the runtime environment because the root certificate authorities differ. The application modules can be regarded as residing in one trust hierarchy with the other modules residing within a different trust hierarchy.

In order to overcome this problem, the process that is described with respect to FIG. 21 illustrates a mechanism for introducing multiple trust hierarchies within a single runtime environment. This solution is further illustrated with respect to FIG. 22. By accepting digital certificates 2206 and 2208, internal smart key device 2202 implicitly forms trust relationships 2210 and 2212 with the foreign internal smart key devices that are associated with the accepted digital certificates. In this manner, internal smart key device 2202 supports trust hierarchies 2214, 2216, and 2218 with root certificates 2204, 2206, and 2208, respectively. Given that root certificates 2206 and 2208 are available for validating the digital certificates of application modules that were signed by the foreign internal smart key devices that are represented by root certificates 2206 and 2208, other modules in the runtime environment are able to form trust relationships 2220 and 2222 that bridge the trust hierarchies.

With reference now to FIG. 23, a flowchart depicts a process for obtaining a current root certificate chain maintained by the local internal smart key device. Whereas FIG. 21 depicts a process for a system administrator to assert a root certificate into the trust hierarchy of a particular runtime environment by storing the root certificate within the local smart key device, FIG. 23 illustrates a process for obtaining the current root certificate chain from the local internal smart key device. The process commences in a block 2302 when the internal smart key device receives a request message from a software smart key unit whereby it requests the current root certificate chain that is maintained by the local internal smart key device. During a block 2304, the local internal smart key device then returns a response message containing the current root certificate chain to the requesting software smart key unit, and the process is concluded. The local internal smart key device may require that the requesting software smart key unit had previously authenticated to the local internal smart key device. In contrast to FIG. 11 or FIG. 21, which illustrate operations in an internal smart key device that are only performed when the system administrator has used an external smart key device to enable the operations, the process that is illustrated in FIG. 23 does not require enablement via an external smart key device.

With reference now to FIG. 24, a flowchart depicts a process for determining whether a digital certificate from a foreign internal smart key device is trustworthy. At some point in time, a module requests access to a computing resource that is controlled by another module within a runtime environment. Assuming that the two modules have not previously completed a mutual authentication operation, then the two modules attempt to complete a mutual authentication operation, e.g., similar to the mutual authentication operation that is described with respect to FIGS. 9A-9B. In this example, it may be assumed that the module that is controlling the desired computing resource is included within the local trust hierarchy that is based on the local internal smart key device while the requesting module is included within a trust hierarchy that is based on a foreign internal smart key device; however, a root certificate for the foreign internal smart key device has been previously asserted into the local smart key device.

The process commences in a block 2402 when the controlling module and the requesting module have initiated an authentication operation. During a block 2404, the controlling module then obtains the digital certificate of the requesting module, most likely directly from the requesting module; the public key from the digital certificate is used to determine whether the requesting module possesses the private key that corresponds to the public key, although these actions are not shown in FIG. 24.

In order to determine the authenticity of the digital signature on the requesting module's digital certificate, the controlling module requires a trustworthy copy of the foreign internal smart key device's digital certificate, thereby providing a copy of the public key that corresponds to the private key that was used to generate the digital signature. Although the requesting module should possess a copy of the digital certificate for the foreign internal smart key device that has issued the requesting module's digital certificate, thereby allowing the requesting module to provide a copy of the foreign internal smart key device's digital certificate to the controlling module, the controlling module needs an independent, trustworthy method for obtaining a copy of the foreign internal smart key device's digital certificate. In an attempt to obtain a copy of the foreign internal smart key device's digital certificate, the controlling module obtains, during a block 2406, the root certificate chain that is currently being maintained by the local internal smart key device.

During a block 2408, the controlling module then verifies that the root certificate for the foreign internal smart key device is in the retrieved root certificate chain. As mentioned above, in the example that is shown in FIG. 24, it may be assumed that a root certificate for the foreign internal smart key device has been previously asserted into the local smart key device. Hence, block 2406 results in the return of a root certificate chain that includes a copy of the foreign internal smart key device's digital certificate.

During a block 2410, the controlling module then verifies the authenticity of the requesting module's digital certificate by verifying the digital signature on the requesting module's digital certificate, and the process is concluded. Assuming that the digital signature is verified, the controlling module may proceed with the authentication operation.

Another embodiment of the present invention is provided hereinbelow with respect to FIG. 25 and FIG. 26, and the example of this implementation relies on various aspects of the present invention that have been previously described. As described above, a hardware security unit within a data processing system, such as an internal smart key device, can function as a certificate authority. As described with respect to FIG. 17, the certificate authority functionality of an internal smart key device may be viewed as the root of a trust model in which the computing resources within a data processing system are entities within a trust relationship hierarchy. The trust relationship hierarchy may be represented, as in FIG. 17, by an inverted pyramid in which the internal smart key device is at the apex of the inverted pyramid, and the computing resources form the inverted pyramid. As described with respect to FIGS. 18-20, the certificate authority functionality of a hardware security unit may be used to sign software cryptographic modules, i.e. software security units or software smart key units, and also to issue digital certificates to software cryptographic modules. As mentioned briefly above, the software package of the software cryptographic module can be sealed to prevent code tampering.

Figure 25:
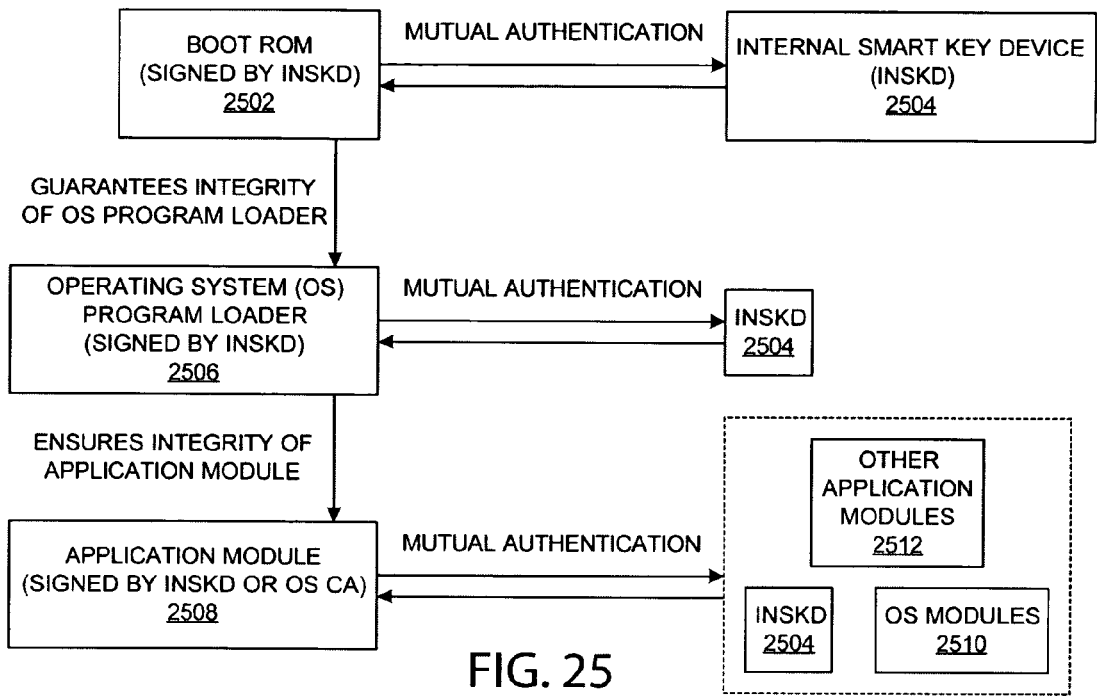
FIG. 25 depicts a dataflow diagram that shows entities within a hardware-assisted trust model that may be used to ensure the integrity of software modules.

With reference now to FIG. 25, a dataflow diagram illustrates entities within a data processing system that implements a hardware-assisted trust model that may be used to ensure the integrity of software modules in accordance with an implementation of the present invention. Before describing FIG. 25, a specific example is described within a Java® runtime environment. After the class files of a Java® application, which includes some form of software cryptographic unit, have been sealed to prevent code tampering, program integrity is enforced by class loaders. To ensure that a class loader can be trusted, the class loader needs to be signed and sealed as well. To guarantee the integrity of the class loader, the loader that loads the class loader, i.e., the operating system program loader, needs to be signed and sealed in some manner. To guarantee the integrity of the operating system program loader, the loader that loads the operating system program loader, i.e. the boot loader in a ROM of the data processing system, needs to be signed and sealed.

With respect to a more generic, non-Java® environment, after the software package of a software cryptographic module has been sealed to prevent code tampering, program integrity is enforced by the operating system program loader. To ensure that the operating system program loader can be trusted, the operating system program loader needs to be signed and sealed as well. To guarantee the integrity of the operating system program loader, the loader that loads the operating system program loader, i.e. the boot loader in the system ROM, needs to be signed and sealed as well. These requirements and operations are reflected in FIG. 25.

Boot ROM 2502 has been signed by the private key of internal smart key device 2504; this may occur during the manufacturing process, during an site-specific installation procedure in which the boot ROM is configured using a flash memory update, or in some other manner. Thereafter, boot ROM 2502 is able to perform a mutual authentication procedure with internal smart key device 2504, thereby creating a trust relationship between boot ROM 2502 and internal smart key device 2504.

Operating system program loader 2506 has also been signed by the private key of internal smart key device 2504; this may occur in accordance with the process that is described with respect to FIG. 18 and FIG. 19. Boot ROM 2502 is able to guarantee the integrity of operating system program loader 2506 by validating the signature on the sealed program module(s) of the operating system program loader 2506 with assistance from internal smart key device 2504, which assists boot ROM 2502 because it has already established a trust relationship with boot ROM 2502 through the completion of a mutual authentication procedure. Thereafter, operating system program loader 2506 is able to perform a mutual authentication procedure with internal smart key device 2504, thereby creating a trust relationship between operating system program loader 2506 and internal smart key device 2504.

Application module 2508 has been signed by the private key of internal smart key device 2504 or by a software cryptographic unit in the operating system that acts as a certificate authority with internal smart key device 2504 acting as the root certificate authority; this may occur in accordance with the process that is described with respect to FIG. 20. Operating system program loader 2506 is able to guarantee the integrity of application module 2508 by validating the signature on the sealed application program module with assistance from internal smart key device 2504, which assists operating system program loader 2506 because it has already established a trust relationship with operating system program loader 2506 through the completion of a mutual authentication procedure. Thereafter, application module 2508 is able to perform a mutual authentication procedure with internal smart key device 2504, operating system modules 2510, or other application modules 2512 in order to trust relationships as necessary.

Figure 26:
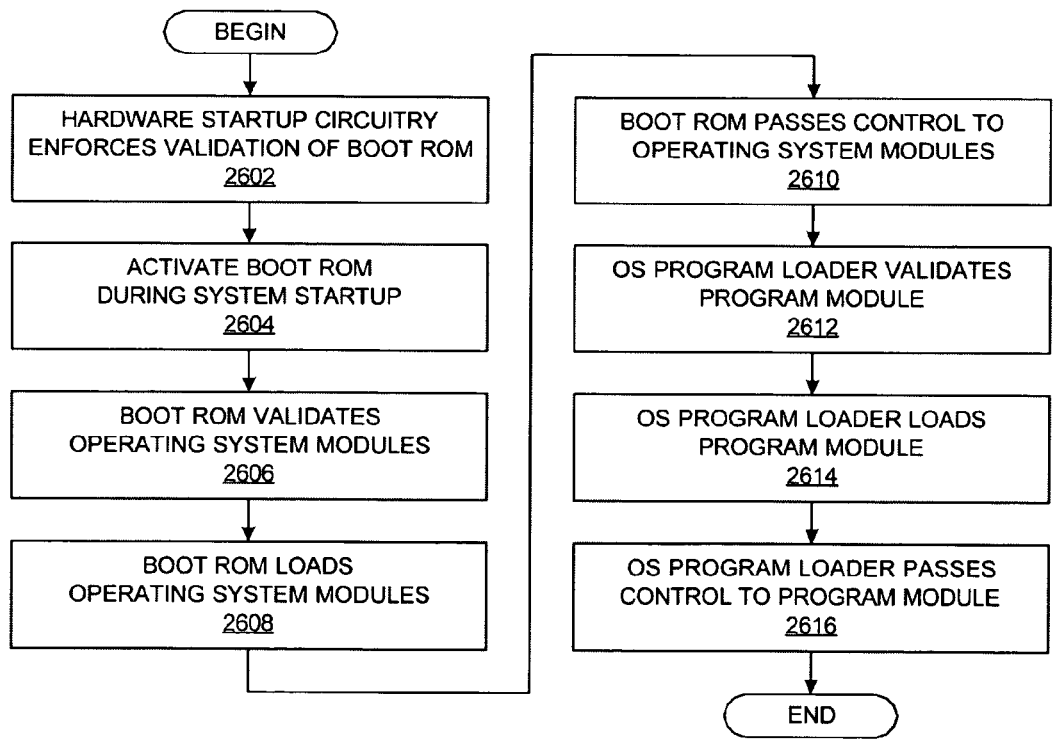
FIG. 26 depicts a flowchart that shows a process for ensuring the integrity of software modules.

With reference now to FIG. 26, a flowchart illustrates a process for ensuring the integrity of software modules in accordance with an implementation of the present invention. The process begins in a block 2602 during the startup of a data processing system when hardware circuitry within the data processing system validates the digital signature on the boot ROM through assistance of the internal smart key unit within the data processing system. Assuming that the digital signature on the boot ROM has been successfully validated, during a block 2604, the startup hardware on the data processing system then activates the boot ROM of the data processing system, thereby preventing the boot ROM from performing many types of operations until the internal smart key device has validated it, or in alternative implementations, preventing the boot ROM from performing any operations until the internal smart key device has validated it.

At some subsequent point in time, presumably still during the startup procedure of the data processing system, during a block 2606, the boot ROM verifies the digital signature(s) on signed/sealed operating system module(s) that are required for further initialization of the data processing system. Assuming that the boot ROM is able to validate the digital signature(s) on operating system module(s), the boot ROM then, during a block 2608, loads the operating system module(s) during a block 2608 and passes execution control to the operating system module(s) during a block 2610.

At some subsequent point in time, during a block 2612, a program loader within the operating system verifies the digital signature on signed/sealed application module(s) that are being invoked on the data processing system, e.g., in response to a request by a user of the data processing system. Assuming that the program loader is able to validate the digital signature(s) on the application module(s), then, during a block 2614, the program loader loads the application module(s) and, during a block 2616, passes execution control to the application module(s), thereby concluding the process. In this manner, the present invention may be employed to ensure the integrity of all software modules that execute on the data processing system; all software that executes on the data processing system must be signed by the internal smart key device or by a software certificate authority module that is trusted by the internal smart key device. The trust relationship is established via mutual authentication between the software certificate authority module and the internal smart key device and also via a configuration process to add the certificate of the software certificate authority module into the list of trusted certificates into the internal smart key device. As partially described with respect to FIG. 25 and more fully with respect to the previous figures, appropriate trust relationships are established during software execution through mutual authentication procedures that employ the digital certificates that have been previously embedded in the respective entities.

Figure 27:
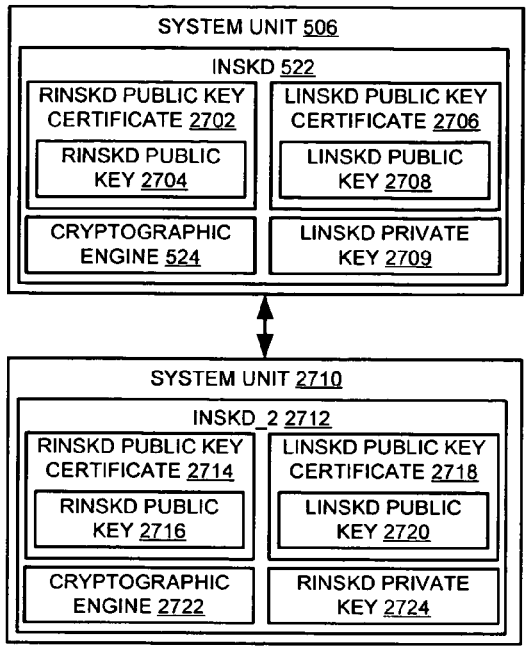
FIG. 27 depicts a block diagram that shows a portion of the data processing system of FIG. 5 and a second data processing system, which, when communicatively coupled, mutually authenticate each other to enable cryptographic functionality in a hardware security unit within one or both of the data processing systems.

FIG. 27 depicts a block diagram that shows a portion of two data processing systems that, when communicatively coupled, mutually authenticate each other to enable cryptographic functionality in a hardware security unit within one of the data processing systems in accordance with an embodiment of the present invention. First system unit 506 was described above in conjunction with FIG. 5. One with skill in the computing arts should recognize that there is a multitude of ways to communicatively couple two systems, such as, but not limited to, direct connections, wirelessly or over many different types of networks.

System unit 506 contains internal smart key device (INSKD) 522 (FIG. 5), which is an integral part of the host system 506, i.e. installed within system 506 such as on a motherboard (not shown). As mentioned above, internal smart key device 522 is preferably a packaged, integrated circuit that is difficult to remove from the host system. While it may be described as a hardware security unit or device, it may also comprise a processing unit for executing instructions. In addition to the components of INSKD 522 described above in conjunction with FIG. 5, INSKD 522 includes a remote INSKD (RINSKD) public key certificate 2702, which includes a RINSKD public key 2704. INSKD 522 also includes a local INSKD (LINSKD) public key certificate 2706 that has LINSKD public key 2708. INSKD 522 also includes a LINSKD private key 2709, which corresponds to LINSKD public key 2708 as an asymmetric cryptographic key pair. LINSKD private key 2709 is stored in a manner such that it cannot be read or accessed by entities that are external INSKD 522. The cryptographic key pair represented by LINSKD public key 2708 and LINSKD private key 2709 are generated by INSKD 522 after INSKD 522 has been authenticated by EXSKD 502 (FIG. 5) or, in the alternative, installed as part of the manufacturing process.

A second system unit 2710 contains a second internal smart key device (INSKD_2) 2712, which is an integral part of the host system 2710, i.e. installed within system 2710 such as on a motherboard (not shown). Like INSKD 522, INSKD_2 2712 is preferably a packaged, integrated circuit that is difficult to remove from the host system. While it may be described as a hardware security unit or device, it may also comprise a processing unit for executing instructions. Like system unit 506, INSKD 522 and EXSKD 502 (FIG. 5), system unit 2710 and INSKD_2 2712 also interface with an external smart key device (EXSKD_2) 2802 (see FIG. 28), which is a portable or removable device. The EXSKD_2 2802 associated with system unit 2710 is employed to enable system unit 2710 to accept new keys and certificates, using corresponding INSKD_2 private and public key pairs and EXSKD_2 public and private key pairs, like the process described above in conjunction with system unit 506 and FIGS. 6-8 and 9A-B. The cryptographic key pair represented by RINSKD public key 2716 and RINSKD private key 2724 are generated by INSKD_2 2712 after INSKD_2 2712 has been authenticated by EXSKD_2 2816 (see FIG. 29) or, in the alternative, installed as part of the manufacturing process.

INSKD_2 2712 includes a RINSKD public key certificate 2714, which includes a RINSKD public key 2716, and a LINSKD public key certificate 2718, which includes a LINSKD public key 2720. INSKD_2 2712 also includes a cryptographic engine 2722 and a RINSKD private key 2724, which corresponds to RINSKD public key 2716 as an asymmetric cryptographic key pair. LINSKD public key 2720 is a copy of LINSKD public key 2708 and RINSKD public key 2704 is a copy of RINSKD public key 2716. RINSKD private key 2724 is stored in a manner such that it cannot be read or accessed by entities that are external INSKD_2 2712.

In this example, system unit 2710 is a portable computer such as, but not limited to, a laptop computer, a notebook computer or a personal digital assistant (PDA) device. INSKD_2 2712 of system unit 2710 enables the functionality of INSKD 506. In the alternative, INSKD_2 2712 and INSKD 506, and thus system unit 2701 and system unit 506, mutually authenticate each other. The process of mutual authentication of system unit 506 and system unit 2710 is explained in more detail below in conjunction with FIGS. 29-31. Simply stated, once INSKD 522 has been enabled as described above in conjunction with FIGS. 6-8 and 9A-B and INSKD_2 2710 has been enabled using a process like that described in FIGS. 6-8 and 9A-B, INSKD 522 and INSKD_2 2710 authenticate and digitally sign each other using public key certificates 2702, 2706, 2714 and 2718, public keys 2704, 2708, 2716 and 2720 and private keys 2709 and 2704 in a process similar to that described in FIGS. 6-8 and 9A-B and described in more detail below in conjunction with FIGS. 29-30. In this manner, multiple system units may be employed to authenticate each other.

System unit 2710 is physically secured by system administration personnel, e.g., an IT administrator. System unit 2710 is secure-communicatively coupled to system unit 506 when an IT administrator needs to enable certain cryptographic functions that can be performed by the INSKD on the host machine, i.e. INSKD 522 on system unit 506. In other words, certain cryptographic functions on system unit 506 are available when system unit 2710 is secure-communicatively coupled with system unit 506. INSKD 2712 produces the results that are needed by the IT administrator because INSKD 2712 contains one or more particular cryptographic private keys for producing certain cryptographic output. Of course, as mentioned above, this relationship may be symmetric in that INSKD 522 may also be configured to enable cryptographic functionality of INSKD 2712 on system unit 2710. Those with skill in the computing arts should realize that there are any number of means to secure-communicatively couple system units 506 and 2710, including but not limited to, direct connections, connections via a secure wireless connection and various network connections employing Secure Socket Layer technology and Virtual Private Network technology, and web services message-layer encryption such as WS-Security, etc.

Figure 28:
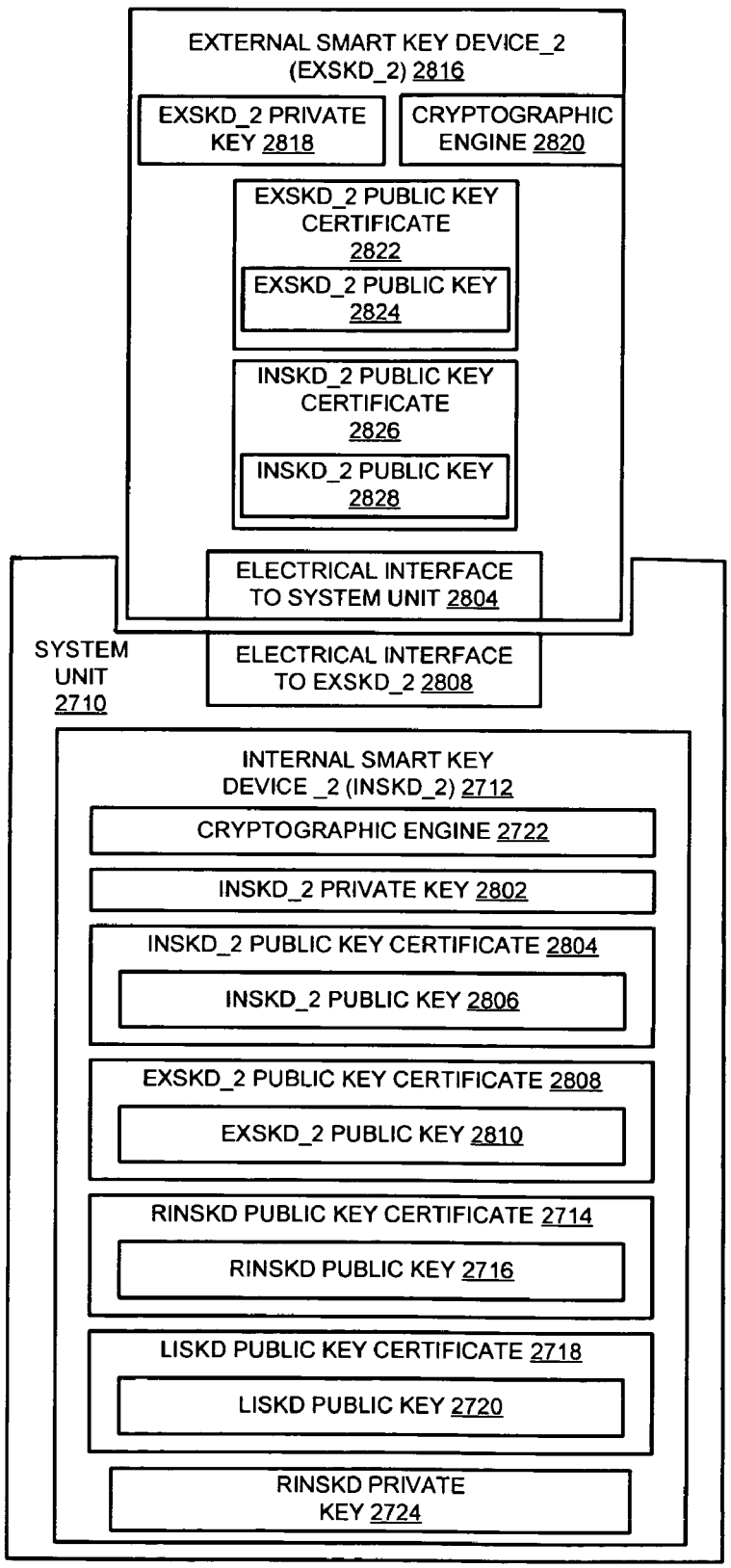
FIG. 28 depicts a block diagram that shows the second system unit, described in FIG. 27, that contains an internal smart key device for executing cryptographic functionality within the system unit of FIG. 5.

With reference to FIG. 28, a block diagram depicts system unit 2710 (FIG. 27) and INSKD_2 2712 (FIG. 27) in more detail. INSKD_2 2712 includes cryptographic engine 2722 (FIG. 27), an INSKD_2 private key 2802, an INSKD_2 public key certificate 2804 and an EXSKD_2 public key certificate 2808. INSKD_2 public key certificate 2804 includes an INSKD_2 public key 2806. EXSKD_2 public key certificate 2808 includes an EXSKD_2 public key 2810.

Cryptographic engine 2722 executes cryptographic functions using various data items that are stored in INSKD_2 2712. INSKD_2 private key 2802 is stored in a manner such that it cannot be read or accessed by entities that are external to INSKD_2 2712. The keys are protected by an INSKD_2 2712 signing and verification process (see FIGS. 6-8 and 9A-B), in a fashion similar to the process employed to protect SWSKU 538 (FIG. 6). INSKD_2 public key certificate 2804 employs INSKD_2 public key 2806 that corresponds to INSKD_2 private key 2802 as an asymmetric cryptographic key pair. INSKD_2 2712 also contains a copy of an EXSKD_2 public key certificate 2808, which itself contains a copy of EXSKD_2 public key 2810 that corresponds to an EXSKD_2 private key 2818, stored on an external smart key device (EXSKD_2) 2816, as an asymmetric cryptographic key pair. The copy of EXSKD_2 public key certificate 2808 may be written onto INSKD_2 2712 as part of its manufacturing or initialization processes.

System unit 2710 includes an electrical interface 2812 that connects to a corresponding electrical interface 2814 on EXSKD_2 2816. EXSKD_2 2816 includes a cryptographic engine 2820 that executes cryptographic functions using various data items that are stored in EXSKD_2 2816. As mentioned above, EXSKD_2 2816 stores EXSKD_2 private key 2818. EXSKD_2 also includes an EXSKD_2 public key certificate 2822 and an INSKD_2 public key certificate 2826. EXSKD_2 public key certificate stores a EXSKD_2 public key 2824 and INSKD_2 public key certificate 2826 stores a INSKD_2 public key 2828.

EXSKD_2 2816 INSKD_2 2712 authenticate and digitally sign each other using public key certificates 2822, 2826, 2804 and 2808, public keys 2824, 2828, 2806 and 2810 and private keys 2818 and 2802 in a process similar to that described in FIGS. 6-8 and 9A-B. System unit 506 and system unit 2710 are communicatively coupled; INSKD 522 and INSKD_2 2712 are authenticated by EXSKD 502 and EXSKD_2 2816, respectively; and, then, INSKD 522 and INSKD_2 2712 are authenticated with respect to each other. These authentication processes are described in more detail below in conjunction with FIGS. 29-31.

Figure 29:
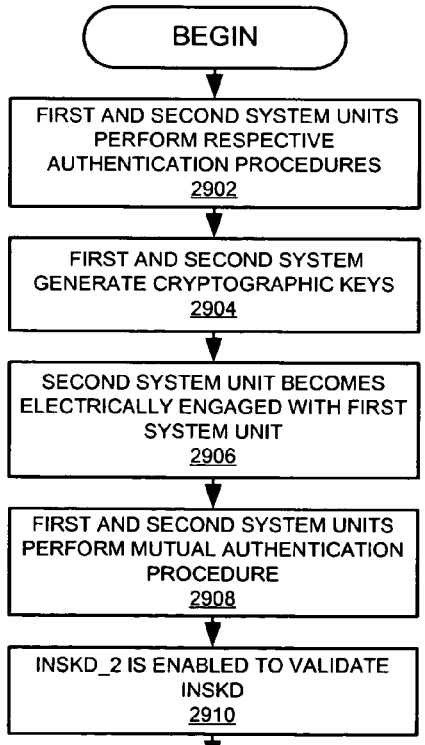
FIG. 29 depicts a flowchart that shows an overview of a process for enabling the cryptographic functionality of the internal smart key device of the first system unit of FIGS. 5 and 27 by means of the second system unit of FIGS. 27 and 28.

With reference now to FIG. 29, a flowchart depicts an overview of a process for enabling the cryptographic functionality of the internal smart key device of a system by means of a second system unit. The process commences in a block 2902 during which 2902, INSKD 522 (FIGS. 5 and 27) of system 506 (FIGS. 5 and 27) performs an authentication process with EXSKD 502 and INSKD_2 2712 of system 2710 (FIG. 27) performs an authentication procedure with EXSKD_2 2816. During a block 2904, INSKD 522 generates the cryptographic key pair represented by LINSKD public key 2708 and LINSKD private key 2709 and INSKD_2 2712 generates the cryptographic key pair represented by RINSKD public key 2716 and RINSKD private key 2724. The generation of the cryptographic key pairs in each of INSKD 522 and INSKD_2 2712 occurs after the particular device has been authenticated, as in block 2902. In addition, the LINSKD public key 2708 is transmitted to INSKD_2 2712 and RINSKD public key 2716 is transmitted to INSKD 522. The means for distributing public keys 2708 and 2716 is not critical, for example, a technician can manually enter keys 2708 and 2716 into the appropriate device by typing at the corresponding system's keyboard (not shown).

During a block 2906, a properly configured computing device, such as system unit 506, (FIGS. 5 and 27) is electrically engaged with a system unit, such as system unit 2710 (FIGS. 27 and 28), that includes an internal smart key device, which in this example is INSKD_2 2712 (FIGS. 27 and 28).

During a block 2908, INSKD 522 and INSKD_2 2712 then perform a mutual authentication procedure by employing public key certificates 2822, 2826, 2804 and 2808, public keys 2824, 2828, 2806 and 2810 and private keys 2818 and 2802 in a process similar to that described in FIGS. 6-8 and 9A-B.

During a block 2910, INSKD_2 2712 is then enabled to validate INSKD 522 subsequently when EXSKD 502 and EXSKD_2 2816 are no longer present. In short, system unit 2710 becomes a smart key device for managing system unit 506. In the alternative, INSKD_2 2712 is also enabled to perform cryptographic functions with respect to system unit 2710 and system unit 506 also becomes a smart key device for system unit 2710. It should be noted that the process of establishing trust between system 506 and 2710, described in conjunction with FIG. 29, only needs to be performed once for system 2710 to be able to function as a smart key device for system 506.

It should also be noted that system unit 506 and system unit 2710 are typically unrelated at the end of the manufacturing process. Each system unit 506 and 2710 ships with its own smart key device 502 and 2816, respectively. At a customer site, an IT administrator can use the process described in this invention to establish the trust relationship between the two system units 506 and 2710 so that he can use system unit 2710 as a "smart key" device to manage the system unit 506 over a secure-communication link across a network. This process can be easily extended to allow one laptop to be used to manage multiple remote system units.

It may be assumed that any error in the mutual authentication procedure prevents INSKD 522 from providing a digital signing of the device or software that failed the mutual authentication process. In other words, without INSKD_2 2712, INSKD 522 is unable to sign new software, such as application 540 (FIG. 5), thus preventing modification or installation of software on system 506. Any software already installed can execute normally and INSKU 522 can provide digital signature validation, decryption and encryption services. In a less restrictive embodiment, the cryptographic functions of INSKD 522 may then be invoked by any application that is running on the host system. In a more restrictive embodiment, the cryptographic functions of the INSKD 522 may be invoked only by an application that includes a software smart key unit, such as SWSKU 538 (FIG. 5).

Figure 30:
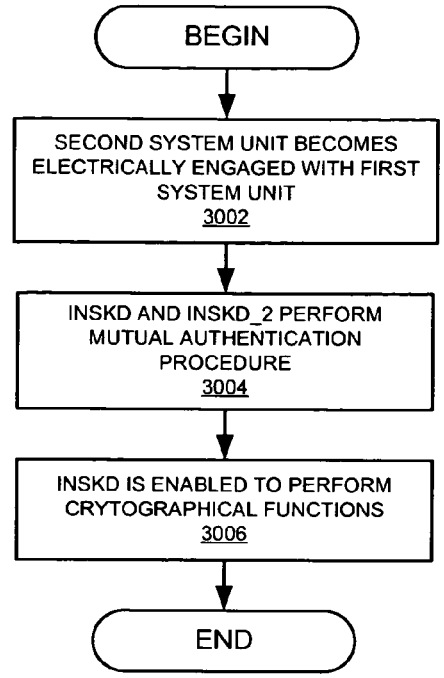
FIG. 30 depicts a flowchart that shows an overview of a process for enabling the cryptographic functionality of the internal smart key device of the system unit of FIGS. 5 and 27.

With reference now to FIG. 30, a flowchart depicts a process for enabling, in this example, the cryptographic functionality of INSKD 522 (FIGS. 5 and 27) of host system 506 (FIGS. 5 and 27) in accordance with an embodiment of the present invention once the mutual authentication procedures of FIG. 29 have been executed. During a block 3002, the process commences when system units 506 and 2710 become communicatively coupled, i.e. electrically or via a communication link. During a block 3104, INSKD 522 and INSKD_2 2708 then perform a mutual authentication procedure. Then, during a block 3006, INSKD 522 is enabled to perform cryptographic functions for other components of system unit 506 such as SWSKU 538 (FIG. 5), and the process is concluded.

While system unit 506 remains communicatively coupled with system unit 2710 (FIGS. 27 and 28), which contains INSKU 2712, INSKU 522 is enabled to provide functionality to act as a certificate authority, i.e. generate new public certificates. INSKD 522, which engages in the mutual authentication upon request from the INSKD_2 2708, may issue a session key to track the session. Typical techniques such as unique (random) session key, session key expiration timeout, session key renewal process, applies to keep track the session. In other words, once the mutual authentication procedure of FIG. 29 is complete, system unit 2710, in conjunction with INSKD_2 2712, can enable INSKD 522 in a manner similar to that performed by EXSKD 502.

In one embodiment, system unit 2710 should be engaged with system unit 522 when installing a new software package. A new public certificate may be issued to the new software package during the software installation; the private key that corresponds to the public key in the newly issued digital certificate may be embedded within the software package, and the private key may be protected by having the internal smart key device sign the software package. Furthermore, in a Java® environment, a JAR file and the Java® package in which the private key is embedded may be further sealed to prevent a malicious user from tampering with the private key.

Figure 31:
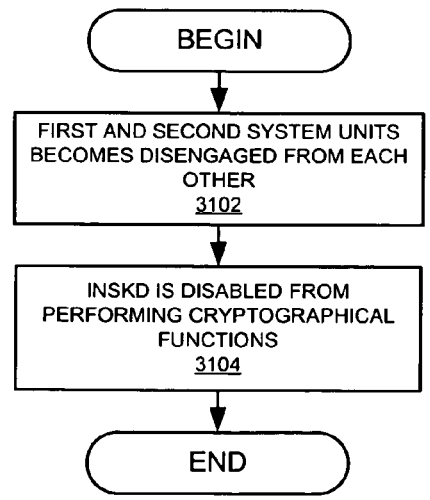
FIG. 31 depicts a flowchart that shows a process for disabling the cryptographic functionality of the internal smart key device of the first system unit of FIGS. 5 and 27.

With reference now to FIG. 31, a flowchart depicts a process for disabling the cryptographic functionality of the internal smart key device of a host system in accordance with an embodiment of the present invention. The process commences during a block 3102 when system unit 2710 (FIGS. 27 and 28) is decoupled from system unit 506 (FIGS. 5 and 27), which contains INSKD 522 (FIGS. 5 and 27). During a block 3104, when system unit 506 detects the decoupling of system unit 2710, INSKD 522 becomes disabled from further performing cryptographic functions, and the process is concluded.

The process that is shown in FIG. 31 operates as a complementary process to either of the processes that are shown in FIG. 29 or FIG. 30. It should be noted, though, that the INSKD 522 may, in the alternative, continue to perform some functions such that it is not completely disabled, depending on the implementation of the present invention. It should also be noted that the processes relating to an internal smart key device and an external smart key device, described above in conjunction with FIGS. 9A, 9B, 10A, 10B, 11A, 11B and 19-26, are also applicable to the cryptographic capabilities of the hardware systems system described above in conjunction with FIGS. 27-31. For the sake of simplicity, figures corresponding to FIGS. 9A, 9B, 10A, 10B, 11A, 11B and 19-26 are not duplicated.

Figure 32:
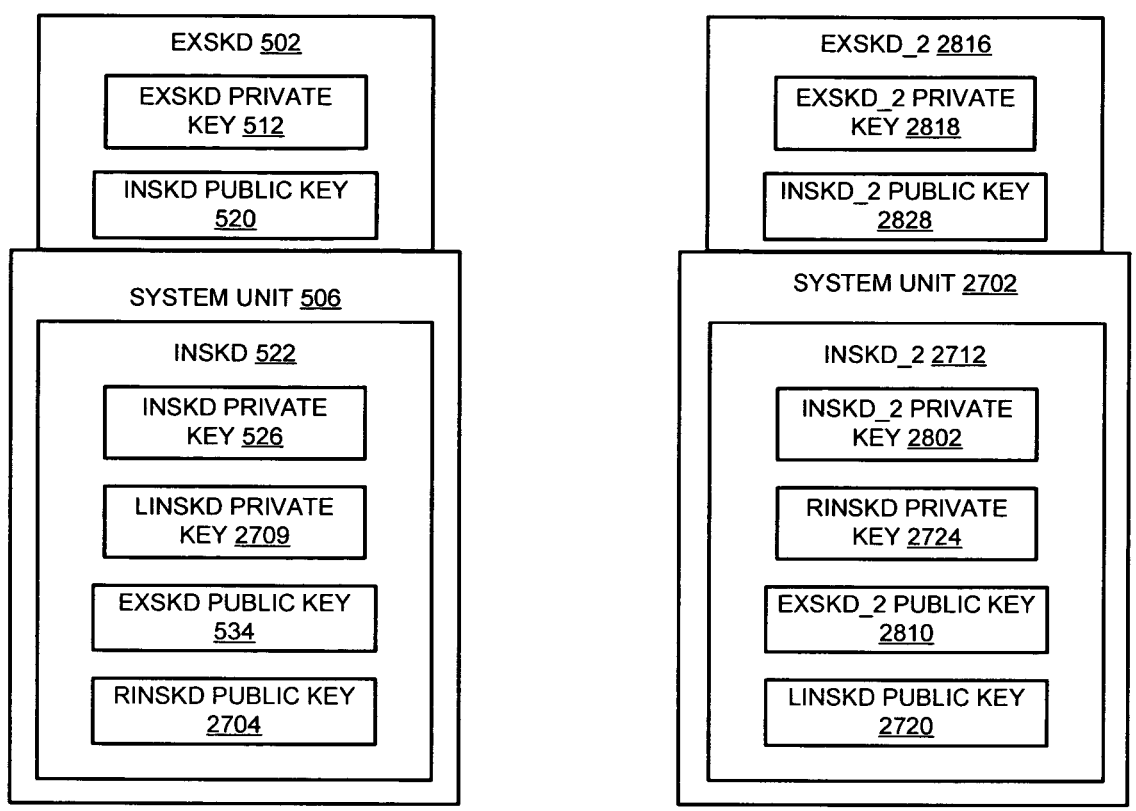
FIG. 32 depicts a block diagram of portions of the first and second data processing systems of FIGS. 5, 27 and 28, illustrating the cryptographic key pairs employed to execute the disclosed subject matter.

FIG. 32 depicts a block diagram of portions of data processing system 506 (FIGS. 5 and 27), INSKD 522 (FIGS. 5 and 27), EXSKD 502 (FIG. 5), data processing system 2710 (FIGS. 27 and 28), INSKD_2 2712 (FIGS. 27 and 28), and EXSKD_2 2816 (FIG. 28) illustrating the cryptographic key pairs employed to execute the disclosed subject matter. A first pair of cryptographic keys includes INSKD private key 526 (FIG. 5) and INSKD public key 520 (FIG. 5), which is employed to authenticate INSKD 522 with respect to EXSKD 502. A second pair of cryptographic keys includes EXSKD private key 512 (FIG. 5) and EXSKD public key 534 (FIG. 5), which is employed to authenticate EXSKD 502 with respect to INSKD 522. A third pair of cryptographic keys includes LINSKD private key 2709 (FIG. 27) and LINSKD public key 2708 (FIG. 27), which are employed to authenticate INSKD 522 with respect to INSKD_2 2712. A fourth pair of cryptographic keys includes RINSKD private key 2724 (FIG. 27) and RINSKD public key 2704 (FIG. 27), which is employed to authenticate INSKD_2 2712 with respect to INSKD 522. A fifth pair of cryptographic keys includes INSKD_2 private key 2802 (FIG. 28) and INSKD_2 public key 2828 (FIG. 28), which is employed to authenticate INSKD_2 2712 with respect to EXSKD_2 2816. Finally, a sixth pair of cryptographic keys includes EXSKD_2 private key 2818 (FIG. 28) and EXSKD_2 public key 2810 (FIG. 28), which is employed to authenticate EXSKD_2 2816 with respect to INSKD_2 2712.

It should be noted that every cryptographic key does not necessarily have to be unique. For example, the first cryptographic key pair and the third cryptographic key pair may both employ the same private key, i.e. INSKD private key 526 may be equal to LINSKD private key 2709. In other words, each device may store a single private key that is employed in multiple cryptographic key pairs.

It may be assumed that the cryptographic functionality in the internal smart key device may be enabled or disabled through software or hardware. For example, in a hardware mode, the operation of particular circuitry in the internal smart key device might be prevented from entering an operable state by certain flip-flops or other mechanisms that must be set or cleared based on an enablement state that represents whether the external smart key device has been accepted; in a software mode, the operation of certain cryptographic functions may be protected by setting and clearing special enablement flags that logically control the execution of the cryptographic functions.

The advantages of the present invention should be apparent in view of the detailed description that is provided above. The present invention provides a mechanism for securing cryptographic functionality within a host system such that it may only be used when a system administrator physically allows it via a hardware security token. In addition, a hardware security unit is integrated into a data processing system, and the hardware security unit acts as a hardware certificate authority. The hardware security unit may be viewed as supporting a trust hierarchy or trust framework within a distributed data processing system. The hardware security unit can sign software that is installed on the machine that contains the hardware security unit. Server processes that use the signed software that is run on the machine can establish mutual trust relationships with the hardware security unit and amongst the other server processes based on their common trust of the hardware security unit.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of actions leading to a desired result. These actions require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

The invention claimed is:

1. A method for performing cryptographic functions, the method comprising:

engaging a first removable hardware device with a first system unit;

engaging a second removable hardware device with a second system unit;

communicatively coupling the first system unit and the second system unit while the first removable hardware device is engaged with the first system unit and the second removable hardware device is engaged with the second system unit;

wherein the first system unit includes a first hardware security unit and the second system unit includes a second hardware security unit, wherein the first hardware security unit includes a first private key corresponding to a first asymmetric cryptographic key pair, a first public key corresponding to a second asymmetric cryptographic key pair, a second private key corresponding to a third asymmetric cryptographic key pair; and a second public key corresponding to a fourth asymmetric cryptographic key pair; and wherein the second hardware security unit contains a third private key corresponding to the second asymmetric cryptographic key pair, a third public key corresponding to the first asymmetric cryptographic key pair, a fourth private key corresponding to the fourth asymmetric cryptographic key pair, and a fourth public key corresponding to the third asymmetric cryptographic key pair;

executing a mutual authentication operation between the first hardware security unit and the first removable hardware device based upon the first and second asymmetric cryptographic key pairs, which the first system unit and the second system unit are communicatively coupled;

executing a mutual authentication operation between the second hardware security unit and the second removable hardware device based upon a fifth and sixth asymmetric cryptographic key pairs while first system unit and the second system unit are communicatively coupled;

executing a mutual authentication operation between the first hardware security unit and the second hardware security based upon the third and fourth asymmetric cryptographic key pairs while the first system unit and the second system unit are communicatively coupled; and in response to successfully performing the mutual authentication operation between the first and second hardware security units, enabling the first system unit to invoke cryptographic functions on the first hardware security unit while the first and second system units remain communicatively coupled.

2. The method of claim 1, further comprising:

executing a software security unit on the first system unit, wherein the software security unit contains a seventh private key corresponding to a seventh asymmetric cryptographic key pair and a seventh public key corresponding to a eighth asymmetric cryptographic key pair, and wherein the first hardware security unit contains an eighth private key corresponding to the eighth asymmetric cryptographic key pair and an eighth public key corresponding to the seventh asymmetric cryptographic key pair;

performing a mutual authentication operation between the software security unit and the first hardware security unit based upon the seventh and eighth asymmetric cryptographic key pairs; and in response to successfully performing the mutual authentication operation between the software security unit and the first hardware security unit, enabling the software security unit to invoke functions on the first hardware security unit while the first and second system units remain communicatively coupled.

3. The method of claim 2, further comprising performing a cryptographic function by the first hardware security unit for the software security unit in response to a request from the software security unit after successfully performing a mutual authentication operation between the first and second hardware security units without requiring the first and second system units to remain communicatively coupled.

4. The method of claim 3, further comprising exchanging a session key between the software security unit and the first hardware security unit during the mutual authentication operation between the software security unit and the first hardware security unit.

5. The method of claim 4, further comprising employing the session key by the software security unit to encrypt subsequent requests to the first hardware security unit in order to prove the software security unit's identity.

6. The method of claim 2, further comprising, in response to a request from the software security unit, generating a digital certificate for the software security unit by the first hardware security unit while the first and second system units remain communicatively coupled.

7. The method of claim 2, further comprising, in response to a request from the software security unit, digitally signing a data item from the software security unit by the first hardware security unit while the first and second system units remain communicatively coupled.

\* \* \* \* \*